US005652060A

United States Patent [19]

Uchida et al.

[11] Patent Number: 5,652,060

[45] Date of Patent: Jul. 29, 1997

[54] SPHERICAL MAGNETIC PARTICLES FOR MAGNETIC TONER AND PROCESS FOR PRODUCING THE SAME

[75] Inventors: Naoki Uchida; Kazuo Fujioka; Koso Aoki; Hiromitsu Misawa; Minoru Kozawa, all of Hiroshima-ken, Japan

[73] Assignee: Toda Kogyo Corporation, Japan

[21] Appl. No.: 663,681

[22] Filed: Jun. 14, 1996

[30] Foreign Application Priority Data

Jun. 15, 1995 [JP] Japan .................................... 7-174203

[51] Int. Cl.$^6$ ........................... C01G 49/08; G03G 9/083

[52] U.S. Cl. ......................... 428/404; 252/62.59; 430/108

[58] Field of Search .................................... 428/403, 404, 428/405; 252/62.59; 430/106.6, 108

[56] References Cited

U.S. PATENT DOCUMENTS

| | | | |
|---|---|---|---|
| 4,578,313 | 3/1986 | Ito et al. | 428/408 |
| 4,822,708 | 4/1989 | Machida et al. | 430/106.6 |
| 5,356,712 | 10/1994 | Hashiuchi et al. | 428/404 |

FOREIGN PATENT DOCUMENTS

| | | |
|---|---|---|
| 0 187 434 | 7/1986 | European Pat. Off. . |
| 0 652 490 A2 | 5/1995 | European Pat. Off. . |
| 0 652 490 A3 | 5/1995 | European Pat. Off. . |

*Primary Examiner*—John Goodrow

*Attorney, Agent, or Firm*—Nixon & Vanderhye

[57] ABSTRACT

Spherical magnetic iron oxide particles for a magnetic toner comprise:

$Fe^{2+}$-containing iron oxide particles having an average particle diameter of 0.05 to 0.30 μm, containing 1.7 to 4.5 atm % of silicon, calculated as Si, based on Fe and not more than 0.35 wt % of sulfur based on the total weight of said $Fe^{2+}$-containing iron oxide particles, and having a sphericity φ (φ=l/w) of 0.8 to 1.0, and a coercive force (Hc) and the average particle diameter (d μm) which satisfy the following relationship:

$$147-322.7\times d \leqq Hc_{(10\ kOe)} \leqq 207-322.7\times d.$$

15 Claims, 2 Drawing Sheets

(×200000)

SPHERICAL MAGNETIC PARTICLES FOR MAGNETIC TONER AND PROCESS FOR PRODUCING THE SAME

BACKGROUND OF THE INVENTION

The present invention relates to spherical magnetic particles for a magnetic toner and a process for producing the same. More particularly, the present invention relates to spherical magnetic iron oxide containing $Fe^{2+}$ particles (spherical magnetic $Fe^{2+}$-containing iron oxide particles) for a magnetic toner which have an excellent fluidity and a high coercive force, which can suppress background development and, hence, produce a high resolution when the spherical magnetic $Fe^{2+}$-containing iron oxide particles are used for a magnetic toner, and which have a high black chromaticity due to a high $Fe^{2+}$ content. The present invention also relates to a process for producing such spherical magnetic $Fe^{2+}$-containing iron oxide particles.

A development process using, as a developer, composite particles which are produced by mixing and dispersing magnetic particles such as magnetite particles with a resin without using a carrier, in other words, what is called a one component magnetic toner is well known and generally used as one of the electrostatic latent image development processes.

With the recent improvement of the performances of copying machines such as a miniaturization of an electrostatic copying machine and an increase in the copying speed, the improvement of the properties of a magnetic toner as a developer has been keenly demanded. That is, a magnetic toner composed of small-diameter particles which can suppress background development and hence, produce a high resolution is in strong demand. Spherical magnetic particles which have conventionally been used have a low coercive force, so that when the spherical magnetic particle are used for a magnetic toner composed of small-diameter particles, they are suffering from the following problem. Since the magnetic attraction is lowered, the toner is difficult to stir on a sleeve and difficult to be uniformly charged. As a result, the toner which is insufficiently charged causes background development.

To solve this problem, magnetic particles having a high coercive force and an excellent fluidity are now eagerly demanded.

Since the fluidity of a magnetic toner is largely dependent upon the surface state of the magnetic particles which are exposed to the surface of the toner, it is necessary that the magnetic particles themselves have an excellent fluidity. Angular magnetic particles such as octahedral and hexahedral magnetic particles have a poor fluidity, and when the angular magnetic particles are produced into a magnetic toner, the toner also has a poor fluidity. On the other hand, roundish magnetic particles such as spherical magnetic particles have a good fluidity, and when the roundish magnetic particles are produced into a magnetic toner, the toner also has a good fluidity.

Therefore, roundish magnetic particles such as spherical magnetic particles, which can produce a magnetic toner having a good fluidity, are now required as a material.

It is known that the black chromaticity of magnetic particles is chiefly influenced by the $Fe^{2+}$ content when the magnetic particles are magnetite particles having a diameter of about 0.1 to 0.5 μm which are used for a magnetic toner, as described in pp. 239 to 240 of *Powder and Powder Metallurgy*, Vol 26, No. 7, as "The black chromaticity of a sample is influenced by the Fe(II) content and the average particle diameter, and powder having an average particle diameter of 0.2 μm is bluish black powder, and it is the most suitable as a black pigment . . . Every sample containing not less than 10% of Fe(II) has a black color although there is a slight difference in black chromaticity. If the Fe(II) content is lowered to less than 10%, the color of each sample changes from black to reddish brown."

Iron oxide containing $Fe^{2+}$ particles having a high $Fe^{2+}$ content and a high black chromaticity are, therefore, required.

Examples of the magnetite particles used as magnetic particles for a magnetic toner are octahedral magnetite particles (Japanese Patent Publication (KOKOKU) No. 44-668(1969)) and spherical magnetite particles (Japanese Patent Publication (KOKOKU) No. 62-51208(1987)). The conventional spherical and octahedral magnetite particles, however, do not have sufficient properties, as described in Japanese Patent Application Laid-Open (KOKAI) No. 201509/1991, as "The $Fe^{2+}$ content of octahedral magnetite particles is about 0.3 to 0.45 in a molar ratio with respect to $Fe^{3+}$, and although they are excellent in the black chromaticity, they have such a large residual magnetization that they are apt to cause magnetic cohesion, so that they have a poor dispersibility and they do not mix well with a resin . . . Spherical magnetite particles have such a small residual magnetization that they are reluctant to magnetic cohesion, so that they have an excellent dispersibility and they mix well with a resin. However, since the $Fe^{2+}$ content is about 0.28 at most in molar ratio with respect to $Fe^{3+}$, the particles have a slightly brownish black color, in other words, they are inferior in black chromaticity . . . . "

Although hexahedral magnetite particles are proposed Japanese Patent Application Laid-Open (KOKAI) No. 3-201509(1991)), since they are angular, the fluidity cannot be said to be sufficient.

A manufacturing process including the step of adding a silicon component during the reaction for producing magnetite in order to improve the properties of magnetite particles have conventionally been investigated. The processes proposed are, for example, a process (Japanese Patent Application Laid-Open (KOKAI) No. 5-213620(1993)) for producing magnetite particles comprising the steps of adding a silicon component to a solution of a ferrous salt, mixing 1.0 to 1.1 equivalents of an alkali with respect to iron to the resultant solution, carrying out an oxidation reaction while maintaining the pH at 7 to 10, adding iron in the middle of the reaction so that the iron is 0.9 to 1.2 equivalents based on the initial alkali, and carrying out an oxidation reaction while maintaining the pH at 6 to 10; and a process (Japanese Patent Publication No. 3-9045(1991)) for producing spherical magnetite particles by blowing an oxygen-containing gas into an aqueous reaction solution of a ferrous salt containing a ferrous hydroxide colloid which is obtained by reacting 0.80 to 0.99 equivalent of an alkali hydroxide with respect to $Fe^{2+}$ by a two-staged reaction comprising the steps of adding 0.1 to 5.0 atm % of a water-soluble silicate (calculated as Si) based on Fe so as to produce magnetite nuclear particles and adding not less than 1.00 equivalent of an alkali hydroxide with respect to the remaining $Fe^{2+}$.

The magnetite particles obtained by the above-described processes are, for example, magnetite particles (Japanese Patent Application Laid-Open (KOKAI) No. 5-213620 (1993)) which contain a silicon component inside of the particle, which have 0.1 to 2.0 wt % of a silicon component (calculated as silicon) based on the magnetite particles, exposed to the surface, which have the following BET specific surface area ($m^2/g$):

$$BET\ (m^2/g)=6/(\text{particle diameter }(\mu m)\times5.2)+B,$$

and which satisfy the relationship $B/A\geqq30$, wherein A represents the silicon abundance (wt %) exposed to the surfaces of the magnetite particles (calculated as silicon) based on the magnetite particles; and spherical magnetite particles (Japanese Patent Publication No. 3-9045(1991)) which have a bulk density of 0.40 to 1.00 g/cm$^3$, which contain 0.1 to 5.0 atm % of Si based on Fe and which have an excellent temperature stability.

A process for producing spherical magnetite particles by a two-staged reaction is also known (Japanese Patent Application Laid-Open (KOKAI) No. 7-110598(1995)). In this process, in the production of magnetite particles by blowing an oxygen-containing gas into an aqueous solution of a ferrous salt containing a ferrous hydroxide colloid which is obtained by reacting 0.90 to 0.99 equivalent of an alkali hydroxide with respect to $Fe^{2+}$, 0.4 to 4.0 atm % of a water-soluble silicate (calculated as Si) based on Fe is added in order to produce magnetite nuclear particles, and then not less than 1.00 equivalent of an alkali hydroxide is added to the residual $Fe^{2+}$, thereby producing spherical magnetite particles containing silicon elements. Thereafter, 0.01 to 2.0 wt % of a water-soluble aluminum salt (calculated as Al) is added to the alkaline suspension containing the residual Si, and after adjusting the pH to 5 to 9, silica and alumina are coprecipitated onto the surfaces of spherical magnetic iron oxide particles containing silicon elements.

The magnetite particles described in Japanese Patent Application Laid-Open (KOKAI) No. 5-213620(1993) are produced by adding 1.0 to 1.1 equivalents of an alkali with respect to ferrous iron in a primary reaction, so that the magnetite particles obtained have a large particle distribution and it is impossible to obtain magnetite particles having a uniform particle diameter.

In the process of producing the magnetite particles described in Japanese Patent Publication No. 3-9045(1991), since the pH is not adjusted in a first-stage reaction and the pH is as low as less than 8.0, a large amount of sulfur is taken in during the reaction, so that the crystallizability is poor and the magnetic anisotropy in crystallization is low, which leads to a low coercive force of the magnetite particles produced.

As described above, magnetic particles for a magnetic toner are now in the strongest demand, which are fine particles having a particle size of 0.05 to 0.30 μm, which have a high coercive force so that the magnetic particles display an excellent fluidity, suppress background development and, hence, produce a high resolution when the magnetic particles are used as magnetic toner particles having a small particle diameter, and which have an excellent black chromaticity due to a high $Fe^{2+}$ content. However, no magnetic particles which have ever been produced, do not satisfy all of these conditions.

As a result of studies undertaken by the present inventors for solving the above-described problems, it has been found that by carrying out a process comprising a first-stage oxidation reaction comprising blowing an oxygen-containing gas under heating, into an aqueous reaction solution of a ferrous salt containing a ferrous hydroxide colloid obtained by reacting an aqueous solution of a ferrous salt and 0.80 to 0.99 equivalent of an aqueous alkali hydroxide based on the ferrous salt, wherein 1.7 to 6.5 atm % of a water-soluble silicate (calculated as Si) based on Fe is added in advance to either of the said aqueous alkali hydroxide and the said aqueous solution of a ferrous salt, and the pH of the aqueous reaction solution into which the oxygen-containing gas is blown in the first-stage reaction is adjusted to 8.0 to 9.5 at the beginning of the step of blowing the oxygen-containing gas, and a second-stage oxidation reaction comprising after adding not less than 1.00 equivalent of an aqueous alkali hydroxide based on the residual $Fe^{2+}$ to the aqueous reaction solution, blowing an oxygen-containing gas into the resultant aqueous reaction solution under heating, the obtained spherical magnetic iron oxide particles for a magnetic toner have a particle size of 0.05 to 0.30 μm, have an excellent fluidity and a high coercive force, can suppress background development and, hence, produce a high resolution when the spherical magnetic iron oxide containing $Fe^{2+}$ particles are used for a magnetic toner, and have a high black chromaticity due to a high $Fe^{2+}$ content. The present invention has been achieved on the basis of this finding.

SUMMARY OF THE INVENTION

It is an object to provide spherical magnetic iron oxide containing $Fe^{2+}$ particles (spherical magnetic $Fe^{2+}$-containing iron oxide particles) for a magnetic toner which are fine particles having a particle size of 0.05 to 0.30 μm, which have a high coercive force so that the magnetic iron oxide containing $Fe^{2+}$ particles display an excellent fluidity, suppress background development and, hence, produce a high resolution when the magnetic iron oxide containing $Fe^{2+}$ particles are used as magnetic toner particles having a small particle diameter, and which have an excellent black chromaticity due to a high $Fe^{2+}$ content.

To accomplish the aims, in a first aspect of the present invention, there are provided spherical magnetic particles for a magnetic toner comprising:

$Fe^{2+}$-containing iron oxide particles having an average particle diameter of 0.05 to 0.30 μm, containing 1.7 to 4.5 atm % of silicon, calculated as Si, based on Fe and not more than 0.35 wt % of sulfur based on the total weight of said $Fe^{2+}$-containing iron oxide particles, and having a sphericity $\phi$ represented by the following formula of 0.8 to 1.0:

$$\phi=l/w$$

wherein l represents an average minor axial diameter of said $Fe^{2+}$-containing particles and w represents an average major axial diameter of said $Fe^{2+}$-containing particles, and a coercive force (Hc) and the average particle diameter (d μm) which satisfy the following relationship:

$$147-322.7\times d\leqq Hc_{(10\ kOe)}\leqq207-322.7\times d.$$

In a second aspect of the present invention, there is provided spherical magnetic particles for a magnetic toner comprise: the magnetic particles defined in the first aspect as core particles; and a compound having a hydrophobic group, which is existent on the surface of each of the core particles in an amount of 0.1 to 2.0 wt %.

In a third aspect of the present invention, there is provided spherical magnetic particles for a magnetic toner comprise: the magnetic particles defined in the first aspect as core particles; and non-magnetic fine oxides particles and/or non-magnetic fine hydrous oxides particles comprising at least one element selected from the group consisting of Fe, Ti, Zr, Si, Al, Mn and Zn, which are adhered on the surface of the core particles in an amount of 0.1 to 20 wt %.

In a fourth aspect of the present invention, there is provided spherical magnetic particles for a magnetic toner comprise: the magnetic particles defined in the first aspect as core particles; and oxides, hydroxides and/or hydrous oxides comprising Si and at least one element selected from the group consisting of Ti, Zr, Al, Mn and Zn, which are deposited on the surface of the core particles in an amount of 0.01 to 20 wt %.

In a fifth aspect of the present invention, there is provided spherical magnetic particles for a magnetic toner comprise: the magnetic particles defined in the first aspect as core particles; and oxides, hydroxides and/or hydrous oxides comprising at least one element selected from the group consisting of Ti, Zr, Al, Mn and Zn, which are deposited on the surface of the core particles in an amount of 0.01 to 20 wt %.

In a sixth aspect of the present invention, there is provided spherical magnetic particles for a magnetic toner comprise: the magnetic particles defined in the first aspect as core particles; oxides, hydroxides and/or hydrous oxides comprising Si and at least one element selected from the group consisting of Ti, Zr, Al, Mn and Zn, which are deposited on the surface of the core particles in an amount of 0.01 to 20 wt %; and a compound having a hydrophobic group, which is existent on the oxides, hydroxides and/or hydrous oxides comprising Si and at least one element selected from the group consisting of Ti, Zr, Al, Mn and Zn in an amount of 0.1 to 2.0 wt % (calculated as carbon element).

In a seventh aspect of the present invention, there is provided spherical magnetic particles for a magnetic toner comprise: the magnetic particles defined in the first aspect as core particles; oxides, hydroxides and/or hydrous oxides comprising at least one element selected from the group consisting of Ti, Zr, Al, Mn and Zn, which are deposited on the surface of the core particles in an amount of 0.01 to 20 wt %; and a compound having a hydrophobic group, which is existent on the oxides, hydroxides and/or hydrous oxides comprising at least one element selected from the group consisting of Ti, Zr, Al, Mn and Zn in an amount of 0.1 to 2.0 wt % (calculated as carbon element).

In an eighth aspect of the present invention, there is provided a process for producing spherical magnetic particles for a magnetic toner defined in the first aspect, said process comprising:

carrying out a first-stage oxidation reaction for producing magnetic particles comprising blowing an oxygen-containing gas under heating to a temperature range of 70° to 100° C., into an aqueous solution of a ferrous salt containing a ferrous hydroxide colloid which is obtained by reacting an aqueous solution of a ferrous salt and 0.80 to 0.99 equivalent of an aqueous alkali hydroxide based on said ferrous salt, 1.7 to 6.5 atm % of a water-soluble silicate (calculated as Si) based on Fe being added in advance to either of said aqueous alkali hydroxide and said aqueous solution of said ferrous salt containing said ferrous hydroxide colloid, and the pH of the aqueous reaction solution into which the oxygen-containing gas is blown being adjusted to 8.0 to 9.5 at the beginning of the step of blowing said oxygen-containing gas;

carrying out a second-stage oxidation reaction for producing magnetic particles by after adding not less than 1.00 equivalent of an aqueous alkali hydroxide based on the residual $Fe^{2+}$ to the aqueous solution after the end of said first-stage reaction, blowing an oxygen-containing gas into the resultant aqueous solution under heating to a temperature range of 70° to 100° C.; and as occasion demands, after the second-stage reaction, neutralizing the resultant suspension to deposit the residual silicon component on the surface of the produced particles.

In a ninth aspect of the present invention, there is provided a magnetic toner comprising: 100 parts by weight of magnetic iron oxide particles according to either of first aspect to fifth aspect; and 10 to 900 parts by weight of a resin for a toner.

DETAILED DESCRIPTION OF THE INVENTION

The spherical magnetic particles for a magnetic toner according to the present invention will first be described.

Figure 1:
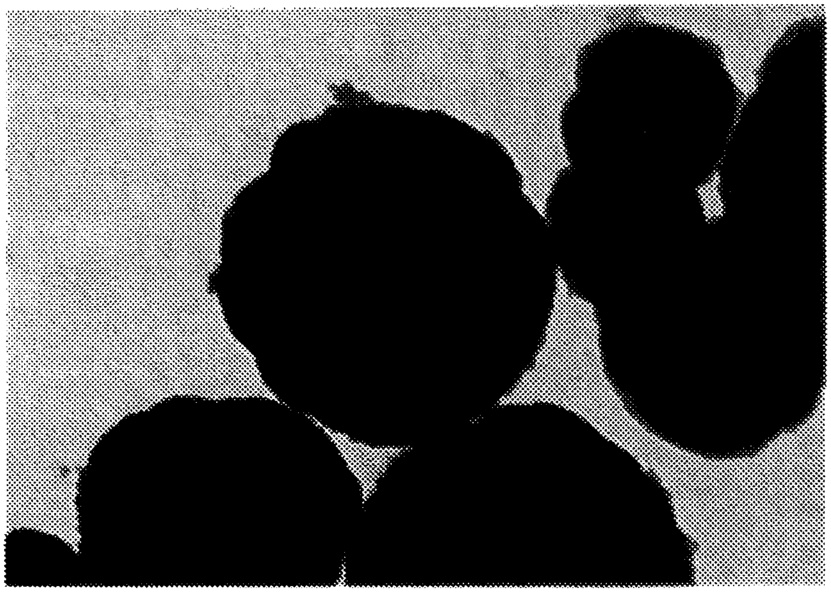
FIG. 1 is an electron microphotograph (×200000) showing the particle structure of the magnetite particles obtained in Example 1.

The magnetic particles according to the present invention are $Fe^{2+}$-containing iron oxide particles such as magnetite particles $[(FeO)_x.Fe_2O_3$, wherein $0<x\leqq 1]$, and $Fe^{2+}$-containing iron oxide particles containing at least one element other than $Fe^{2+}$, selected from the group consisting of Al, Ti, Mn, Zn, Cu, Ni, Co and Mg, in amount of not more than 10 atm % (calculated as the element) based on the total Fe in the $Fe^{2+}$-containing iron oxide particles, and have a spherical shape as shown in a transmission electron microphotograph shown in FIG. 1.

The magnetic particles according to the present invention have an average particle diameter of 0.05 to 0.30 μm, preferably 0.1 to 0.30 μm. If the average particle diameter is less than 0.05 μm, the number of particles in a unit volume becomes so large and the number of contact points between particles increases so large that the adhesive force between powder layers becomes large and when such particles are used for a magnetic toner, the dispersibility of the particles in a resin becomes poor. On the other hand, if the average particle diameter exceeds 0.30 μm, the number of magnetic particles contained in one toner particle is reduced, and there is non-uniformity in the distribution of the magnetic particles in one toner particle, so that the toner becomes lacking in the uniformity of electrification.

The sphericity ϕ of the magnetic particles according to the present invention, which is represented by the following formula (1), is 0.8 to 1.0, preferably 0.83 to 1.00. If the sphericity ϕ is less than 0.8, the particles have such a low spherical property that a good fluidity is not obtained. The sphericity ϕ represented by the following formula is never beyond 1.0:

$$\text{Sphericity } (\phi)=l/w \quad (1)$$

wherein l represents average minor axial diameter of the magnetic particles and w represents average major axial diameter of magnetic particles.

The average major axial diameter and average minor axial diameter of the magnetic particles are values measured from a projection of electron microphotograph of the magnetic particles.

The coercive force (Hc) of the magnetic particles of the present invention under an external magnetic field of 10 kOe and the average particle diameter [d (μm)] thereof satisfy the following relationship (2):

$$147-322.7\times\leqq Hc(10\ kOe)\leqq 207-322.7\times d \quad (2)$$

If the coercive force exceeds the upper limit of the above-mentioned formula, the magnetic attraction becomes so strong that the magnetic toner produced from the magnetic particles cannot easily transfer from a sleeve onto a photosensitive drum, which makes it difficult to obtain a sufficient picture density. On the other hand, if the coercive force is less than the lower limit of the above-mentioned formula, the magnetic attraction becomes so weak that the magnetic toner produced from the magnetic particles is to scatter onto a photosensitive drum and cause background development.

Figure 2:
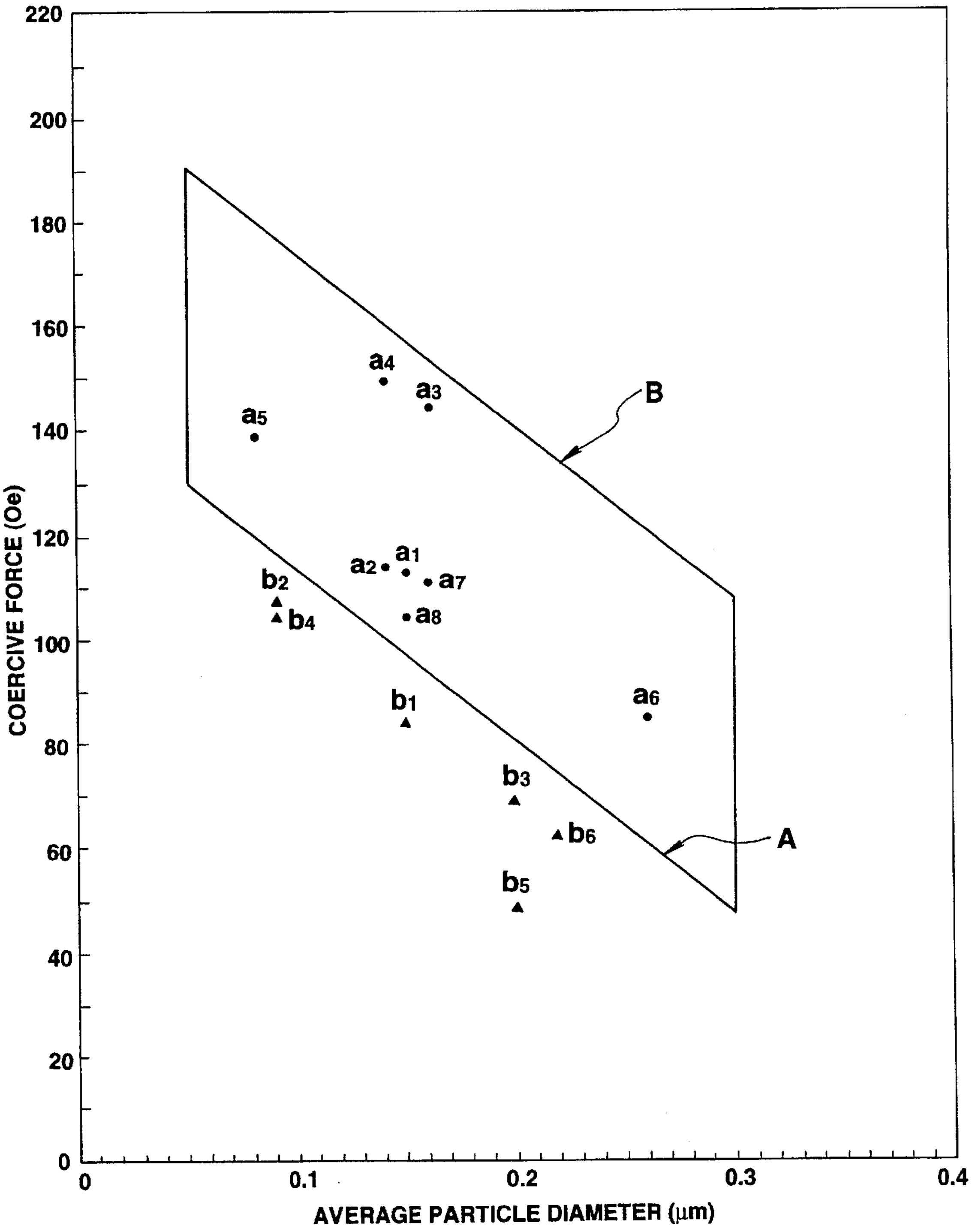
FIG. 2 shows the relationship between the coercive force under an external magnetic field of 10 kOe and the average particle diameter of the magnetic particles.

In FIG. 2 showing the relationship between the coercive force under an external magnetic field of 10 kOe and the average particle diameter of the magnetic particles, the magnetic particles of the present invention have the coercive force under an external magnetic field of 10 kOe of 50 to 191 Oe and the average particle diameter of 0.05 to 0.35 μm, wherein the coercive force (Hc) and the average particle diameter [d (μm)] satisfy the above-mentioned formula (2). In the FIG. 2, $A=147-322.7\times d$ and $B=207-322.7\times d$. Therefore, it is required that the relationship between the coercive force under an external magnetic field of 10 kOe and the average particle diameter of the magnetic particles of the present invention falls within a parallelogram in the FIG. 2.

For example, $a_1$ to $a_8$ in FIG. 2 denote magnetic particles obtained in Examples 1 to 8 described later, respectively. On the other hand, the magnetic particles obtained by the known method are denoted by the symbols $b_1$ to $b_6$, i.e., $b_1$ is magnetic particles obtained by Comparative Example 3 described later; $b_2$ is magnetic particles obtained by Example 2 of Japanese KOKAI 7-110598; $b_3$ and $b_4$ are magnetic particles obtained by Examples 1 and 10 of Japanese KOKOKU 3-9045, respectively; and $b_5$ and $b_6$ are magnetic particles obtained by Example 1 and Comparative Example 5 of Japanese KOKAI 5-213620, respectively.

The magnetic particles of the present invention have a saturation magnetization of 80 to 92 emu/g, preferably 82 to 90 emu/g. If the saturation magnetization is less than 80 emu/g, since the $Fe^{2+}$ content in the particles reduces, the magnetic particles may be tinged with red.

The degree of compression of the magnetic particles of the present invention, which is a barometer of fluidity, is not more than 45%, preferably not more than 43%. The lower limit of the degree of compression is preferably about 20%. If the degree of compression exceeds 45%, the fluidity of the magnetic particles may be inferior.

The angle θ of repose of the magnetic particles of the present invention, which is another barometer of fluidity, is not more than 45°, preferably not more than 43°. The lower limit of the angle θ of repose is preferably about 30°. If the angle θ of repose exceeds 45°, the fluidity of the magnetic particles may be inferior.

The $Fe^{2+}$ content of the magnetic particles of the present invention is 12 to 24 wt %, preferably 17 to 24 wt % based on the total weight of the magnetic particles. If the $Fe^{2+}$ content is less than 12 wt %, it becomes difficult to obtain a sufficient black chromaticity. If it exceeds 24 wt %, the magnetic iron oxide particles are easily oxidized and become environmentally unstable.

The magnetic particles of the present invention contain 1.7 to 4.5 atm %, preferably 2.0 to 4.0 atm % of Si based on Fe. Namely, the magnetic particles of the present invention are $Fe^{2+}$-containing iron oxide particles in which Si is contained inside the particles and silicon component is deposited on the surface of the particles. If the Si content is less than 1.7 atm %, the particles obtained have a hexahedral shape, so that the magnetic particles are inferior in the fluidity. If the Si content exceeds 4.5 atm %, the amount of $SiO_2$ on the particle surfaces sometimes increases. In addition, since $SiO_2$ is precipitated separately from the particles, when the magnetic iron oxide particles are used for a toner, the moisture adsorption becomes high and the environmental stability of the toner is lowered.

In case where the amount of $SiO_2$ precipitated onto the particle surfaces is large, the adhesive force of the toner is lowered, so that the fluidity of the toner is enhanced. The preferable amount of $SiO_2$ precipitated onto the particle surfaces is 0.01 to 4.0 wt %, preferably 0.05 to 2.0 wt %, more preferably 0.05 to 1.0 wt %, still more preferably 0.05 to 0.5 wt % in due consideration of the moisture adsorption.

The sulfur content in the magnetic particles of the present invention is not more than 0.35 wt %, preferably not more than 0.25 wt %. If the sulfur content exceeds 0.35 wt %, it means that the magnetic iron oxide particles take in much sulfur during the reaction for producing the magnetic particles, so that the crystallomagnetic anisotropy is insufficient and the coercive force of the magnetic particles becomes low.

The magnetic particles according to the present invention include the following magnetic iron oxide particles comprising the above-described magnetic particles as the core particles and other materials on the surface of each of the core particles.

(1) Magnetic particles for a magnetic toner comprise: the said magnetic particles as core particles; and a compound having a hydrophobic group which is existent on the surface of each of the core particles.

(2) Magnetic particles for a magnetic toner comprise: the said magnetic particles as core particles; and non-magnetic fine oxides particles and/or non-magnetic fine hydrous oxides particles comprising at least one element selected from the group consisting of Fe, Ti, Zr, Si, Al, Mn and Zn, which are adhered on the surface of the core particles.

(3) Magnetic particles for a magnetic toner comprise: the said magnetic particles as core particles; and oxides, hydroxides and/or hydrous oxides comprising Si and at least one element selected from the group consisting of Ti, Zr, Al, Mn and Zn, which are deposited on the surface of the core particles.

(3') Magnetic particles for a magnetic toner comprise: the said magnetic particles as core particles; and oxides, hydroxides and/or hydrous oxides comprising at least one element selected from the group consisting of Ti, Zr, Al, Mn and Zn, which are deposited on the surface of the core particles.

(4) Magnetic particles for a magnetic toner comprise: the said magnetic particles as core particles; oxides, hydroxides and/or hydrous oxides comprising Si and at least one element selected from the group consisting of Ti, Zr, Al, Mn and Zn, which are deposited on the surface of the core particles; and a compound having a hydrophobic group which is existent on the oxides, hydroxides and/or hydrous oxides comprising Si and at least one element selected from the group consisting of Ti, Zr, Al, Mn and Zn.

(4') Magnetic particles for a magnetic toner comprise: the said magnetic particles as core particles; oxides, hydroxides and/or hydrous oxides comprising at least one element selected from the group consisting of Ti, Zr, Al, Mn and Zn, which are deposited on the surface of the core particles; and a compound having a hydrophobic group which is existent on the oxides, hydroxides and/or hydrous oxides comprising at least one element selected from the group consisting of Ti, Zr, Al, Mn and Zn.

The said magnetic particles (1), (2), (4) and (4') according to the present invention have an average particle diameter of 0.05 to 0.30 μm, preferably 0.1 to 0.30 μm. The said magnetic particles (3) and (3') according to the present invention have an average particle diameter of 0.05 to 0.40 μm, preferably 0.1 to 0.40 μm.

The upper limit of the degree of compression of each of the above-described surface-treated magnetic particles (1), (2), (3), (3'), (4) and (4') is 45%. The lower limit of the degree of compression thereof is preferably about 20%. The upper limit of the oil absorption of each of the above-described surface-treated magnetic particles (1), (2), (3), (3'), (4) and (4') is 24 ml/100 g. The lower limit of the oil absorption thereof is preferably about 10 ml/100 g.

The surface-treated magnetic iron oxide particles (1), (2), (3), (3'), (4) and (4') will be described in detailed.

(1) The magnetic particles have a compound having a hydrophobic group which is existent on the surface of the said magnetic iron oxide particles in the amount of the compound having a hydrophobic group of 0.1 to 2.0% by weight, preferably 0.1 to 1.5% by weight (calculated as carbon).

If the amount of the compound having a hydrophobic group is less than 0.1% by weight, the magnetic iron oxide particles may be made insufficiently hydrophobic. If it exceeds 2.0% by weight, the compound having a hydrophobic group covers the $SiO_2$ deposited on the surface of the magnetic iron oxide particles, so that the magnetic iron oxide particles are inferior in the fluidity.

As a compound having a hydrophobic group, silane coupling agents, titanate coupling agents, aluminate coupling agents, zirconate coupling agents, silicones, higher fatty acids, surfactants or the like are usable.

Examples of the silane coupling agents are 3-methacryloxypropyl trimethoxysilane, 3-chloropropyl trimethoxysilane, vinyltriethoxysilane, vinyltrimethoxysilane, vinyltrichlorosilane, vinyltris (βmethoxyethoxy) silane, γ-(methacryloxypropyl) trimethoxysilane, γ-aminopropyltrimethoxysilane, N-B-(aminoethyl)γ-aminopropyltrimethoxysilane, β-(3,4 epoxycyclohexyl)ethyltrimethoxysilane, γ-glycidoxypropyl trimethoxysilane and γ-mercaptopropyl trimethoxysilane, which are soluble to an organic solvent as a liquid dispersion medium.

Examples of the titanate coupling agents are water-soluble coupling agents such as triethanolamine titanate chelate, lactic acid titanate chelate and isopropyltri(N-aminoethyl.aminoethyl) titanate; and coupling agents which are soluble to an organic solvent as a liquid dispersion medium, such as isopropyl tristearoyl titanate, isopropyl tridodecylbenzene sulfonyl titanate, isopropyltris (dioctylpyrophosphate) titanate, isopropyltri(N-aminoethyl-aminoethyl) titanate, tetraoctylbis(ditridecyl phosphate) titanate, tetra(2-2-diallyloxymethyl-1-butyl)bis(ditridecyl) phosphate titanate, bis(dioctylpyrophosphate) oxyacetate titanate and bis(dioctylpyrophosphate) ethylenetitanate.

Examples of the aluminate coupling agents are acetoalkoxyaluminum diisopropylate, aluminum diisopropoxymonoethyl acetoacetate, aluminum trisethyl acetoacetate and aluminum trisacetylacetonate, which are soluble to an organic solvent as a liquid dispersion medium.

Examples of the zirconate coupling agents are zirconium tetrakis acetylacetonate, zirconium dibuthoxybis acetytacetonate, zirconium tetrakisethyl acetoacetate, zirconium tributhoxymonoethyl acetoacetate and zirconium tributhoxy acetylacetonate, which are soluble to an organic solvent as a liquid dispersion medium.

As the silicones, silicon oil, etc. are usable.

As the fatty acids having carbon atoms of not less than 8, preferably not less than 16, more preferably 18 to 50, stearic acid, isostearic acid, palmitic acid, isopalmitic acid, oleic acid, arachic acid, lignoceric acid, lacceric acid, etc. are usable.

As the surfactants, known phosphate anionic surfactant, fatty ester nonionic surfactant, natural fats and oils derivatives such as alkyl amine, or the like are usable.

(2) The magnetic particles have non-magnetic fine oxides particles and/or non-magnetic fine hydrous oxides particles comprising at least one element selected from the group consisting of Fe, Ti, Zr, Si, Al, Mn and Zn, which are adhered on the surface of the said magnetic particles as core particles in an amount of 0.1 to 20 wt %.

The non-magnetic fine oxides particles and/or non-magnetic fine hydrous oxides particles comprising an element selected from the group consisting of Fe, Ti, Zr, Si, Al, Mn and Zn, (hereinafter referred to as "non-magnetic fine oxides and/or hydrous oxides particles") include, for instance, non-magnetic fine oxides particles such as granular, acicular (columnar), spindle, or plate-like (lamellar) hematite (a-$Fe_2O_3$) fine particles, granular or columnar $TiO_2$ fine particles, granular $ZrO_2$ fine particles, granular $SiO_2$ fine particles, granular or acicular $Al_2O_3$ fine particles, granular MnO or $MnO_2$ fine particles and granular ZnO fine particles; and non-magnetic fine hydrous oxides particles such as granular, acicular (columnar), spindle, or plate-like (lamellar) hydrous-ferric oxide fine particles such as goethite, lepidcrosite and akageneite fine particles, hydrous-aluminum oxide fine particles such as AlOOH fine particles, hydrous-titanium oxide fine particles such as $TiO(OH)_2$ fine particles, hydrous-manganium oxide fine particles such as MnOOH fine particles.

The size of the said non-magnetic fine oxides and hydrous oxides particles is 0.01 to 0.1 μm. When the particle size is less than 0.01 μm or exceeds 0.1 μm, the dispersibility tends to deteriorate. Considering the dispersibility, the particle size is preferably in the range of 0.02 to 0.06 μm.

The size of the non-magnetic fine oxides particles and/or non-magnetic fine hydrous oxides particles of a specific element adhering to the surface of the magnetic iron oxide particles according to the present invention is preferably the one which satisfies the following formulae (1) to (4):

$$1/100 \leqq b/a \leqq 1/3 \quad (1)$$

$$1/100 \leqq c/a \leqq 1 \quad (2)$$

$$1/100 \leqq d/a \leqq 1/3 \quad (3)$$

$$1/100 \leqq d/c < 1 \quad (4)$$

more preferably one which satisfies the following formulae (5) to (8):

$$1/50 \leqq b/a \leqq 1/5 \quad (5)$$

$$1/50 \leqq c/a \leqq 1/2 \quad (6)$$

$$1/50 \leqq d/a \leqq 1/5 \quad (7)$$

$$1/10 \leqq d/c < 1 \quad (8)$$

wherein a is an average particle diameter of the magnetic iron oxide particles as core particles, b is an average particle diameter of the granular non-magnetic fine oxides particles and/or non-magnetic fine hydrous oxides particles in case of granular, c is an average major axial diameter or average plate-surface diameter of the non-magnetic fine oxides particles and/or non-magnetic fine hydrous oxides particles in case of acicular (columnar), spindle or plate-like, and d is an average minor axial diameter or lamellar thickness of the non-magnetic fine oxides particles and/or non-magnetic fine hydrous oxides particles in case of acicular (columnar), spindle or plate-like.

When the b/a ratio is less than 1/100, it is difficult to improve a dispersibility of the magnetic particles, and when the b/a ratio exceeds 1/3, it is difficult to adhere the non-magnetic fine oxides particles and/or non-magnetic fine hydrous oxides particles to the magnetite particle surfaces.

When the c/a ratio is less than 1/100,it is difficult to improve a dispersibility of the magnetic iron oxide particles, and when the c/a ratio exceeds 1, it is difficult to adhere the non-magnetic fine oxides particles and/or non-magnetic fine hydrous oxides particles to the magnetic iron oxide particle surfaces.

When the d/a ratio is less than 1/100,it is difficult to improve a dispersibility of the magnetic iron oxide particles, and when the b/a ratio exceeds 1/3, it is difficult to adhere the non-magnetic fine oxides particles and/or non-magnetic fine hydrous oxides particles to the magnetic iron oxide particle surfaces.

When the d/c ratio is less than 1/100,the non-magnetic fine oxides particles and/or non-magnetic fine hydrous oxides particles tend to break during the adhering-treatment and the produced powder can contribute deterioration of dispersibility.

The amount of the non-magnetic fine oxides and/or hydrous oxides particles of a specific element adhering to the surface of the said magnetic iron oxide particle according to the present invention is preferably 0.1 to 10 wt % in view of the saturation magnetization.

(3) The magnetic particles have oxides, hydroxides and/or hydrous oxides comprising Si and at least one element selected from the group consisting of Ti, Zr, Al, Mn and Zn, which are deposited on the surface of the said magnetic particles as core particles in an amount of 0.01 to 20 wt %.

(3') The magnetic particles have oxides, hydroxides and/or hydrous oxides comprising at least one element selected from the group consisting of Ti, Zr, Al, Mn and Zn, which are deposited on the surface of the said magnetic particles as core particles in an amount of 0.01 to 20 wt %.

The oxides, hydroxides and/or hydrous oxides in the present invention comprising an element selected from the group consisting of Ti, Zr, Si, Al, Mn and Zn, (hereinafter referred to as "oxides, hydroxides and/or hydrous oxides ") include, for instance, oxides such as $TiO_2$, $ZrO_2$, $SiO_2$, $Al_2O_3$, MnO, $MnO_2$, ZnO, etc.; hydroxides such as $Ti(OH)_2$, $Ti(OH)_4$, $Zr(OH)_4$, $Si(OH)_4$, $Al(OH)_3$, $Mn(OH)_2$, $Zn(OH)_2$, etc.; and hydrous oxides such as $TiO(OH)_2$, AlOOH, MnOOH ,etc. Further, the oxides, hydroxides and/or hydrous oxides according to the present invention include (i) coprecipitated oxides, hydroxides and/or hydrous oxides of Si and at least one an element selected from the group consisting of Ti, Zr, Al, Mn and Zn; (ii) coprecipitated hydroxides and/or hydrous oxides of at least two element selected from the group consisting of Ti, Zr, Al, Mn and Zn; and (iii) oxides of at least two element selected from the group consisting of Ti, Zr, Al, Mn and Zn, which are produced by heating the thus obtained coprecipitated hydroxides and/or hydrous oxides (ii) at 100° to 600° C. Among of them, coprecipitated oxides, hydroxides and/or hydrous oxides of Si and at least one element selected from the group consisting of Ti, Zr, Al, Mn and Zn, more preferably coprecipitated oxides, hydroxides and/or hydrous oxides composed of Si and Al, Si and Ti, Si and Zr, Si and Mn, or Si and Zn, are preferred.

The amount of the oxides, hydroxides and/or hydrous oxides disposed on the surface of the magnetic particle according to the present invention is preferably 0.1 to 10 wt % in view of the saturation magnetization.

(4) The magnetic particles have the said oxides, hydroxides and/or hydrous oxides comprising Si and at least one element selected from the group consisting of Ti, Zr, Al, Mn and Zn, which are deposited on the surface of the said magnetic particles in an amount of 0.01 to 20 wt % as defined in the above-mentioned (3); and further have a compound having a hydrophobic group which is existent on the said oxides, hydroxides and/or hydrous oxides comprising at least one element selected from the group consisting of Ti, Zr, Si, Al, Mn and Zn, in the amount of the compound having a hydrophobic group of 0.1 to 2.0 wt %, preferably 0.1 to 1.5 wt % (calculated as carbon element) as defined in the above-mentioned (1).

(4') The magnetic particles have the said oxides, hydroxides and/or hydrous oxides comprising at least one element selected from the group consisting of Ti, Zr, Al, Mn and Zn, which are deposited on the surface of the said magnetic particles in an amount of 0.01 to 20 wt % as defined in the above-mentioned (3); and further have a compound having a hydrophobic group which is existent on the said oxides, hydroxides and/or hydrous oxides comprising at least one element selected from the group consisting of Ti, Zr, Si, Al, Mn and Zn, in the amount of the compound having a hydrophobic group of 0.1 to 2.0 wt %, preferably 0.1 to 1.5 wt % (calculated as carbon element) as defined in the above-mentioned (1).

A process for producing the above-described magnetic particles for a magnetic toner according to the present invention will now be described.

In order to produce magnetic particles for a magnetic toner a two-staged oxidation reaction is adopted, which comprises carrying out a first-stage oxidation reaction for producing magnetite particles comprising blowing an oxygen-containing gas, under heating to a temperature range of 70° to 100° C., into an aqueous solution of a ferrous salt containing a ferrous hydroxide colloid obtained by reacting an aqueous solution of a ferrous salt and 0.80 to 0.99 equivalent of an aqueous alkali hydroxide based on the ferrous salt; carrying out a second-stage oxidation reaction for producing magnetite nuclear particles comprising after adding not less than 1.00 equivalent of an aqueous alkali hydroxide based on the residual $Fe^{+2}$ to the aqueous reaction solution after the end of the first-stage reaction, blowing an oxygen-containing gas, under heating to a temperature range of 70° to 100° C. into the resultant aqueous solution; and as occasion demands, after the second-stage oxidation reaction, neutralizing the resultant alkaline suspension by adding acid such as sulfuric acid, etc. to deposit the residual silicon component on the surface of the produced particles. In this process, it is required that 1.7 to 6.5 atm % of a water-soluble silicate (calculated as Si) based on Fe is added in advance to either of the aqueous alkali hydroxide and the aqueous solution of the ferrous salt containing the ferrous hydroxide colloid, and the pH of the oxygen-containing gas in the first-stage reaction is adjusted to 8.0 to 9.5 at the beginning of the step of blowing the oxygen-containing gas.

Examples of the aqueous solution of a ferrous salt usable in the present invention are an aqueous ferrous sulfate, and an aqueous ferrous chloride.

As the aqueous alkali hydroxide in the present invention are usable aqueous solutions of a hydroxide of an alkali metal such as sodium hydroxide and potassium hydroxide, aqueous solutions of a hydroxide of an alkali earth metal such as magnesium hydroxide and calcium hydroxide, aqueous solutions of an alkali carbonate such as sodium carbonate and sodium ammonium, ammonia water, etc.

The amount of aqueous alkali hydroxide used before the adjustment of the pH in the first-stage reaction is 0.80 to 0.99 equivalent, preferably 0.90 to 0.99 equivalent based on the $Fe^{+2}$ in the aqueous solution of a ferrous salt. If the aqueous alkali hydroxide is less than 0.80 equivalent, a goethite is unfavorably produced in the product, so that it is impossible to obtain the target magnetite particles in a single phase. If the aqueous alkali hydroxide exceeds 0.99 equivalent, the particle size distribution is so large that it is not possible to obtain particles having a uniform particle diameter.

The reaction temperature in the first-stage reaction is 70° to 100° C. If the temperature is lower than 70° C., acicular goethite particles are unfavorably produced in the product. Although magnetite particles are produced even if the temperature exceeds 100° C., since an apparatus such as an autoclave is required, it is not industrially easy.

Oxidization is carried out by blowing an oxygen-containing gas (e.g., air) into the solution.

As the water-soluble silicate, sodium silicate, potassium silicate, etc. are usable in the present invention.

The amount of water-soluble silicate added is 1.7 to 6.5 atm %, preferably 2.0 to 4.5 atm % (calculated as Si) based on Fe. If the amount of water-soluble silicate is less than 1.7 atm %, the particles produced are hexahedral particles, which have an inferior fluidity. On the other hand, if the amount of water-soluble silicate added exceeds 6.5 atm %, the amount of $SiO_2$ on the particle surfaces sometimes increases. In addition, since $SiO_2$ is precipitated separately from the particles, when the magnetic iron oxide particles are used for a toner, the moisture adsorption becomes high and the environmental stability of the toner is lowered. When the amount of $SiO_2$ precipitated onto the particle surfaces is large, the adhesive force of the toner is lowered, so that the fluidity of the toner is enhanced. The preferable amount of $SiO_2$ precipitated onto the particle surfaces is 0.01 to 0.5 wt % in due consideration of the moisture adsorption.

The water-soluble silicate in the present invention influences the shape of the magnetite particles produced. It is, therefore, required that the time at which the water-soluble silicate is added is before the production of magnetite particles by blowing an oxygen-containing gas into an aqueous reaction solution of a ferrous salt containing a ferrous hydroxide colloid. It is possible to add the water-soluble silicate to either of an aqueous alkali hydroxide and an aqueous reaction solution of a ferrous salt containing a ferrous hydroxide colloid.

If the water-soluble silicate is added to an aqueous solution of a ferrous salt, since the silicate deposits as $SiO_2$ separately from a ferrous salt as soon as the water-soluble silicate is added, it is impossible to achieve the object of the present invention.

In the first-stage reaction, the pH of the suspension is adjusted to a range of 8.0 to 9.5, preferably to a range of 8 to 9.3 by adding an aqueous alkali hydroxide when the step of blowing of an oxygen-containing gas is started. If the pH of the suspension is less than 8.0, since sulfate ions are apt to be adsorbed onto the surfaces of the crystals produced and the amount of sulfur element taken into the crystals increases, the magnetic anisotropy in crystallization is low, which leads to a low coercive force of the magnetite particles produced. If the pH of the suspension exceeds 9.5, since angular octahedral particles are produced, the fluidity becomes inferior.

The amount of aqueous alkali hydroxide used in the second-stage reaction is not less than 1.00 equivalent based on the residual $Fe^{2+}$ at the beginning of the second stage reaction. If the amount is less than 1.00 equivalent, the total amount of residual $Fe^{2+}$ is not deposited. The preferable amount of aqueous alkali hydroxide, which is not less than 1.00 equivalent, is industrially determined.

The reaction temperature at the second-stage reaction is the same as that at the first-stage reaction. The oxidization means is also the same as that in the first-stage reaction.

The step of adequately stirring the suspension for a necessary time may be inserted, if necessary, between the addition of the materials and the first-stage reaction and between the first-stage reaction and the second-stage reaction.

The process for producing the above-described magnetic particles (1), (2), (3), (3'), (4) and (4') for a magnetic toner will be described in the following.

(1) The magnetic particles for a magnetic toner comprising: magnetic particles as core particles and a compound having a hydrophobic group which is existent on the surface of each of the core particles, are produced by compacting, shearing and spatula-stroking the magnetic iron oxide particles as the core particles and a compound having a hydrophobic group by using a wheel-type kneader or an attrition mill so as to coat the surfaces of the magnetic particles with the compound having the hydrophobic group. The amount of the compound having a hydrophobic group added is 0.11 to 2.5 parts by weight based on 100 parts by weight of the magnetic particles to be treated.

As the wheel-type kneader, there can be used Simpson mix muller, multimill, back flow mixer, Irich mill, etc., but wet pan mill, melanger, whirl mill and quick mill are inapplicable since they merely perform compression and spatula-stroking and no shearing work.

In case of using a wheel-type kneader, the linear load is preferably in the range of 10 to 200 kg/cm. When the linear load is less than 10 kg/cm, it is difficult to adhere the compound having a hydrophobic group to the core particles. When the linear load is greater than 200 kg/cm, the particles may be broken. The more preferred range of the linear load is 20 to 150 kg/cm.

In case the said coating treatment is carried out by using a wheel-type kneader, the treating time is 10 to 120 minutes. When the treating time is less than 10 minutes, it is difficult to coat the compound having a hydrophobic group to the core particles. When the treating time exceeds 120 minutes, it is unfavorable in terms of economy although the desired coating treatment can be accomplished. The more preferred range of treating time is 20 to 90 minutes.

(2) The magnetic particles for a magnetic toner comprising: the magnetic particles as core particles, and non-magnetic fine oxides particles and/or non-magnetic fine hydrous oxides particles comprising at least one element selected from the group consisting of Fe, Ti, Zr, Si, Al, Mn and Zn, which are adhered on the surface of the magnetic particles, are produced by compacting, shearing and spatula-stroking the magnetic iron oxide particles as core particles with the non-magnetic fine oxides particles and/or non-magnetic fine hydrous oxides particles comprising at least one element selected from the group consisting of Fe, Ti, Zr, Si, Al, Mn and Zn, by using a wheel-type kneader or an attrition mill.

A wheel-type kneader or an attrition mill can be used for the compression of the magnetic iron oxide particles. The wheel-type kneaders usable in the present invention include Simpson mix muller, multimill, Stotz mill, back flow mixer, Irich mill, etc. Wet pan mill, melanger, whirl mill and quick mill can not be used in the present invention since they merely have the functions of compression and spatula-stroking, and no shearing action.

Deposition (attachment) of the non-magnetic fine oxides particles and/or non-magnetic fine hydrous oxides particles composed of a specific element can be accomplished (i) by adding and mixing the non-magnetic fine oxides particles and/or non-magnetic fine hydrous oxides particles in the suspension containing magnetic iron oxide particles, and then subjecting the resultant suspension to filtration, water-washing and drying; or (ii) by adding the non-magnetic fine oxides particles and/or non-magnetic fine hydrous oxides particles to the magnetic iron oxide particles which have been obtained after filtration, water-washing and drying, and then subjecting the said particles to dry-mixing.

The amount of the non-magnetic fine oxides particles and/or non-magnetic fine hydrous oxides particles composed of a specific element is 0.11 to 25 parts by weight based on 100 parts by weight of the particles to be treated.

Adhering-treatment according to the present invention can be conducted, for example, by compressing, shearing and spatula-stroking the magnetic iron oxide particles, and the non-magnetic fine oxides particles and/or non-magnetic fine hydrous oxides particles of a specific element by using a wheel-type kneader or an attrition mill.

As the wheel-type kneader, there can be used Simpson mix muller, multimill, back flow mixer, Irich mill, etc., but wet pan mill, melanger, whirl mill and quick mill are inapplicable since they merely perform compression and spatula-stroking and no shearing work.

In case of using a wheel-type kneader for the said adhering-treatment, the linear load is preferably in the range of 10 to 200 kg/cm. When the linear load is less than 10 kg/cm, it is difficult to adhere the non-magnetic fine oxides particles and/or non-magnetic fine hydrous oxides particles to the core particles. When the linear load is greater than 200 kg/cm, the particles may be broken. The more preferred range of the linear load is 20 to 150 kg/cm.

In case the said adhering-treatment is carried out by using a wheel-type kneader, the treating time is 10 to 120 minutes. When the treating time is less than 10 minutes, it is difficult to adhere the non-magnetic fine oxides particles and/or non-magnetic fine hydrous oxides particles to the core particles. When the treating time exceeds 120 minutes, it is unfavorable in terms of economy although the desired adhering-treatment can be accomplished. The more preferred range of treating time is 20 to 90 minutes.

(3) & (3') The magnetic particles for a magnetic toner comprising: the magnetic particles as core particles; and oxides, hydroxides and/or hydrous oxides comprising at least one element selected from the group consisting of Ti, Zr, Si, Al, Mn and Zn, which are deposited on the surface of the magnetic iron oxide particles, are produced by adjusting the pH of the alkaline suspension containing produced magnetic iron oxide particles and a water-soluble salt comprising at least one element selected from the group consisting of Ti, Zr, Si, Al, Mn and Zn to the range of 2 to 12 so as to deposit the surfaces of the magnetic iron oxide particles with hydroxides or coprecipitated hydroxides comprising at least one element selected from the group consisting of Ti, Zr, Si, Al, Mn and Zn, and if necessary, subjecting to heat-treatment.

In the present invention, the magnetic particles deposited with hydroxides comprising at least one element selected from the group consisting of Ti, Zr, Al, Mn and Zn are produced by adjusting the pH of the alkaline suspension (pH=about 10 to about 12) to the range of 2 to 12 at 50 to 100° C., for example, (i) to the range of 2 to 12 in case of using Ti as an element; (ii) to the range of 3 to 12 in case of using Zr as an element; (iii) to the range of 5 to 12 in case of using Al as an element; (iv) to the range of 8 to 12 in case of using Mn as an element; and (v) to the range of 7 to 12 in case of using Zn as an element.

The temperature of the alkaline suspension at the time of addition of the water-soluble salt of at least one element selected from the group consisting of Ti, Zr, Al, Mn and Zn thereto is 50° to 100° C. When the said temperature of the alkaline suspension is less than 50° C., the magnetic particles are not well dispersed in the suspension. When the temperature of the said alkaline solution is higher than 100° C., although it is possible to maintain uniform dispersion of the magnetic particles in the suspension, the process is not economical.

The magnetic particles deposited with hydrous oxides comprising at least one element selected from the group consisting of Ti, Al and Mn, are produced by subjecting the resultant hydroxides-deposited particles to heat-treatment, for example, (i) allowing to stand the resultant suspension at 50° to 100° C. or heating the obtained hydroxides-deposited particles at 100 to 200° C. in case of using Ti as an element; (ii) heating the obtained hydroxides-deposited particles at 100° to 400° C. in case of using Al as an element; and (iii) heating the obtained hydroxides-deposited particles at 10 to 50° C. in case of using Mn as an element.

The magnetic particles deposited with oxides comprising at least one element selected from the group consisting of Ti, Zr, Al, Mn and Zn, are produced by subjecting the resultant hydroxides-deposited particles to heat-treatment, for example, heating the obtained hydroxides-deposited particles at 200° to 600° C. in a non-oxidative gas such as nitrogen gas in case of using Ti, Zr, Al, Mn and Zn as an element; or are directly produced by adjusting the alkaline suspension which contains residual Si component of 0.01 to 2.0 wt % or in which water-soluble silicates are added thereto, if necessary, to the range of 5 to 9.

The magnetic particles deposited with coprecipitated oxides, hydroxides and/or hydrous oxides comprising Si and at least one element selected from the group consisting of Ti, Zr, Al, Mn and Zn, are produced by adjusting the pH of the alkaline suspension to the range of 5 to 9, for example, to obtain magnetic particles deposited with coprecipitated $SiO_2$ and hydroxides comprising at least one element selected from the group consisting of Ti, Zr, Al, Mn and Zn; and if necessary, subjecting to heat-treatment.

The magnetic particles deposited with coprecipitated oxides, hydroxides and/or hydrous oxides comprising at least two element selected from the group consisting of Ti, Zr, Al, Mn and Zn, are produced by adjusting the pH of the alkaline suspension to the range of 2 to 12; and if necessary, subjecting to heat-treatment.

For example, the magnetic iron oxide particles deposited with coprecipitated oxides of Si and hydroxides of at least one element selected from the group consisting of Ti, Zr, Al, Mn and Zn, are produced by adjusting the pH of the alkaline suspension (pH=10 to 12), for example, to the range of 5 to 9.

The magnetic particles deposited with coprecipitated oxides of Si and hydrous oxides of at least one element selected from the group consisting of Ti, Zr, Al, Mn and Zn, are produced by subjecting the resultant hydroxides-deposited particles to heat-treatment, for example, (i) allowing to stand the resultant suspension at 50° to 100° C. or heating the obtained Ti hydroxides-deposited particles at 100° to 200° C.; (ii) heating the obtained Al hydroxides-deposited particles at 100° to 400° C.; and (iii) heating the obtained Mn hydroxides-deposited particles at 10° to 50° C.

The magnetic particles deposited with coprecipitated oxides of Si and at least one an element selected from the group consisting of Ti, Zr, Al, Mn and Zn, are produced by subjecting the resultant hydroxides-deposited particles to heat-treatment, for example, by heating the obtained hydroxides-deposited particles at 200° to 600° C. in a non-oxidative gas such as nitrogen gas in case of using Ti, Zr, Al, Mn and Zn as an element.

As the water-solUble titanium salt, titanyl sulfate, titanium tetrachloride, titanium trichloride, etc. are usable.

As the water-soluble zirconium salt, zirconium sulfate, zirconium dichloride, zirconium, zirconium trichloride, etc. are usable.

As the water-soluble aluminum salt, aluminum sulfate, aluminum nitrate and aluminum chloride can be exemplified.

As the water-soluble zinc salt, zinc sulfate, zinc chloride, zinc nitrate, zinc phosphate etc. are usable.

As the water-soluble manganate, manganeous sulfate, manganic sulfate, manganeous chloride, manganic chloride, etc. are usable.

The amount of the water-soluble salt of Ti, Zr, Al, Mn or Zn added in the process is 0.01 to 50 parts by weight, preferably 0.01 to 45 parts by weight based on 100 parts by weight of the particles to be treated.

(4) & (4') The magnetic iron oxide particles for a magnetic toner comprising: the magnetic iron oxide particles as core particles, oxides, hydroxides and/or hydrous oxides comprising at least one element selected from the group consisting of Ti, Zr, Si, Al, Mn and Zn, which are deposited on the surface of the core particles, are produced by the process defined in the above-mentioned (3) & (3') so as to coat the surfaces of the magnetic iron oxide particles with a oxides, hydroxides and/or hydrous oxides comprising at least one element selected from the group consisting of Ti, Zr, Si, Al, Mn and Zn; and then the process defined in the above-mentioned (1) so as to cover oxides, hydroxides and/or hydrous oxides comprising at least one element selected from the group consisting of Ti, Zr, Si, Al, Mn and Zn, which are deposited on the surface of the magnetic iron oxide particles, with the compound having a hydrophobic group.

What is the most important in the present invention is the fact that when the magnetic particles for a magnetic toner obtained by a process comprising a first-stage reaction for producing magnetic particles comprising blowing an oxygen-containing gas, under heating to a temperature range of 70° to 100° C., into an aqueous reaction solution of a ferrous salt containing a ferrous hydroxide colloid obtained by reacting an aqueous solution of a ferrous salt and 0.80 to 0.99 equivalent of an aqueous alkali hydroxide based on the ferrous salt, and a second-stage reaction for producing magnetic particles comprising adding not less than 1.00 equivalent of an aqueous alkali hydroxide based on the residual $Fe^{2+}$ after the end of the first-stage reaction and blowing an oxygen-containing gas into the aqueous alkali hydroxide under heating to a temperature range of 70° to 100° C., wherein not less than 1.7 atm % and less than 6.5 atm % of a water-soluble silicate (calculated as Si) based on Fe is added in advance to either of the aqueous alkali hydroxide and the aqueous solution of a ferrous salt and the pH of the oxygen-containing gas in the first-stage reaction is adjusted to 8.0 to 9.5 at the beginning of the step of blowing the oxygen-containing gas, have an excellent fluidity and a high coercive force, so that when the magnetic iron oxide particles are used for a magnetic toner, the toner has a high resolution with background development suppressed and an excellent black chromaticity due to the high $Fe^{2+}$ content.

The present inventors found that the coercive force of the magnetic particles obtained is dependent upon the sulfur content in the magnetic crystalline particles. That is, if a large amount of sulfur is contained in the crystals, it is considered that the magnetic particles take in much sulfur during the reaction for producing the magnetic iron oxide particles, and it is assumed that since the crystallizability is low, the crystallomagnetic anisotropy is insufficient and the coercive force of the magnetic iron oxide particles becomes low. On the other hand, it is considered, that if the crystals contain hardly any sulfur, since the crystallizability is good, the crystallomagnetic anisotropy is also good, so that the coercive force becomes high.

Conventionally, as described in Japanese Patent Publication (KOKOKU) No. 3-9045(1991), when 0.80 to 0.99 equivalent of an aqueous alkali hydroxide with respect to $Fe^{2+}$ is added to the aqueous solution of a ferrous salt, as described in Japanese Patent Publication (KOKOKU) No. 3-9045(1991), the pH is less than 8.0, and the magnetic particles producing reaction is still continued, the sulfur ions in the reaction suspension are incorporated into the magnetite crystalline particles produced and taken into the crystalline particles together with the crystal growth, so that the magnetic particles are inferior in the crystallizability. In contrast, in the present invention, since the pH is adjusted to 8.0 to 9.5 before the reaction, sulfur ions are hard to incorporate into the magnetite crystalline particles produced, so that the amount of sulfur taken into the crystals is small. It is, therefore, considered that the crystallizability is good and, hence, the crystallomagnetic anisotropy is good, so that magnetite particles having a high coercive force are obtained.

The magnetic particles according to the present invention are spherical and have a high fluidity. Since the amount of sulfur contained in the magnetic particles is small, the crystallomagnetic anisotropy is good, thereby obtaining a high coercive force. Consequently, when the magnetic particles of the present invention are used for a magnetic toner having a small particle diameter, a high resolution is produced with background development suppressed. In addition, the $Fe^{2+}$ content is high enough to produce an excellent black chromaticity.

The BET specific surface area of the magnetic particles of the present invention is preferably 3 to 30 $m^2/g$, more preferably 5 to 25 $m^2/g$; the coercive force thereof is 50 to 191 Oe, preferably 50 to 175 Oe; the saturation magnetization thereof is 80 to 92 emu/g, preferably 82 to 90 emu/g; the sphericity thereof is 0.8 to 1.0, preferably 0.83 to 1.00; the degree of compression thereof is not more than 45%, preferably not more than 43%; and the angle of repose thereof is not more than 45°, preferably not more than 43°.

The magnetic particles (1), (2), (3), (3'), (4) and (4') according to the present invention have the following properties in addition to the above-described properties of the BET specific surface area, the coercive force, the sphericity, and the angle of repose.

The magnetic particles (1) according to the present invention have a saturation magnetization of 70 to 92 emu/g, a compression degree of not more than 43%, preferably not more than 42% and an oil absorption of not more than not more than 20 ml/100 g, preferably not more than 19 ml/100 g.

The magnetic particles (2) according to the present invention have a saturation magnetization of 60 to 92 emu/g, a compression degree of not more than 43%, preferably not more than 42% and an oil absorption of not more than not more than 20 ml/100 g, preferably not more than 19 ml/100 g.

The magnetic particles (3) & (3') according to the present invention have a saturation magnetization of 60 to 92 emu/g, a compression degree of not more than 43%, preferably not more than 42% and an oil absorption of not more than not more than 20 ml/100 g, preferably not more than 19 ml/100 g.

The magnetic particles (4) & (4') according to the present invention have a saturation magnetization of 60 to 92 emu/g, a compression degree of not more than 43%, preferably not more than 42% and an oil absorption of not more than not more than 20 ml/100 g, preferably not more than 19 ml/100 g.

The magnetic particles of the present invention have an average particle diameter of 0.05 to 0.30 μm, and the magnetic particles have an excellent fluidity and a high coercive force. Therefore, when the magnetic particles are used for a magnetic toner having a small particle diameter, since background development is suppressed, a high resolution is obtained. In addition, since the $Fe^{2+}$ content is high, the magnetic particles are optimum as the magnetic particles for a magnetic toner for electrophotography.

The magnetic particles of the present invention are useful for magnetic toner.

The magnetic particles adhered with the non-magnetic fine oxides particles and/or non-magnetic fine hydrous oxides particles comprising at least one element selected from the group consisting of Fe, Ti, Zr, Si, Al, Mn and Zn; deposited with the oxides, hydroxides and/or hydrous oxides comprising at least one element selected from the group consisting of Ti, Zr, Si, Al, Mn, and Zn; or deposited with the oxides, hydroxides and/or hydrous oxides comprising at least one element selected from the group consisting of Ti, Zr, Si, Al, Mn and Zn, and having the compound having a hydrophobic group thereon (subjected to hydrophobic treatment) according to the present invention can have a smaller magnetization. The magnetic iron oxide particles having the compound having a hydrophobic group thereon (subjected to hydrophobic treatment); or deposited with the oxides, hydroxides and/or hydrous oxides comprising at least one element selected from the group consisting of Ti, Zr, Si, Al, Mn and Zn, and having the compound having a hydrophobic group thereon (subjected to hydrophobic treatment) according to the present invention can have a smaller the monolayer adsorption capacity of $H_2O$. In other words, the hydrophilic property of such magnetic particles is changed to a hydrophobic property.

In addition, since such magnetic particles of the present invention assume a black color, and they have a small magnetization and a high dispersibility in a vehicle or a resin due to the hydrophobic surfaces, they are suitable as materials for magnetic toners.

Magnetic toner produced from the magnetic particles of the present invention is obtained by mixing the particles with a resin.

The resin used in the present invention is not restricted, and known binder resins for magnetic toner are usable. Examples of such resins are styrene-acrylate copolymer, styrene-butyl acrylate copolymer, polystyrene, polyvinyl chloride, phenol resin, epoxy resin, polyacrylate, polyester, polyethylene and polypropylene. The mixing ratio of the resin is 100 to 900 parts by weight, preferably 100 to 400 parts by weight, based on 100 parts by weight of the magnetic particles.

The magnetic toner of the present invention may contain coloring agent, plasticizer, surface lubricant, antistatic agent, charge control agent, etc., in the range which does not deteriorate the dispersibility of the magnetic particles in the binder resin.

A low-molecular resin such-as polyethylene or polypropylene may be added, if necessary, as an additive.

In producing the magnetic toner of the present invention, known methods (e.g., a method disclosed in Japanese Patent Application Laid-Open (KOKAI) No. 2-80 (1990) corresponding to U.S. Pat. No. 5,066,558 and Japanese Patent Application Laid-Open (KOKAI) No. 2-181757 (1990)) may be adopted.

The particle diameter of the magnetic toner of the present invention is 3 to 15 μm, preferably 5 to 12 μm.

EXAMPLES

The present invention will now be explained with reference to examples and comparative examples.

(1) The average particle diameter in each of the following examples and comparative examples are expressed by the average values measured in electron microphotographs.

(2) The specific surface area is expressed by the value measured by a BET method.

(3) The magnetic characteristics were measured under an external magnetic field of 10 kOe by a vibration sample magnetometer VSM-3S-15 (manufactured by Toei Kogyo, CO., LTD.).

(4) The shapes of the particles were observed through a scanning electron microscope (Hitachi S-800).

(5) In order to measure the sphericity of the magnetic particles, not less than 250 magnetic iron oxide particles were selected from an electron microphotograph taken by a transmission electron microscope (JEM-1OOS, manufactured by Japan Electron Optics Laboratory Co., Ltd.), and the average minor axial diameter (l) and the average major axial diameter (w) were obtained. The sphericity was calculated from the following formula:

$$\text{Sphericity } (\phi)=l/w$$

l: average minor axial diameter of magnetic iron oxide particles, w: average major axial diameter of magnetic iron oxide particles.

(6) The amount of Si in the magnetic particles is expressed by the value obtained by measuring the Si content in accordance with the general rule of fluorescent X-ray analysis, JIS K0119 by "Fluorescent X-ray analyzer" Model 3063M" (manufactured by Rigaku Denki Kogyo CO., LTD.).

(7) The $Fe^{2+}$ content is expressed by the value obtained by the following chemical analysis. In an inert gas atmosphere, 25 cc of a mixed solution containing phosphoric acid and sulfuric acid in the ratio of 2:1 was added to 0.5 g of magnetic particles so as to dissolve the magnetic particles. The aqueous solution was diluted and after adding several drops of diphenylamine sulfonic acid to the diluted solution as an indicator, and oxidation-reduction titration using an aqueous potassium dichromate was carried out. The end point was the point at which the diluted solution assumed a purple color. The $Fe^{2+}$ content was obtained from the amount of aqueous potassium dichromate used until the end point.

(8) It is possible to estimate the fluidity of the magnetic particles from the degree of compression and the angle θ of repose.

(8-1) The degree of compression was calculated from the following formula by substituting a bulk density (ρa) and a tap density (ρt), which were measured respectively, into the formula:

Degree of compression=[($\rho t-\rho a$)/$\rho t$]×100.

The smaller the degree of compression, the better the fluidity.

The bulk density ($\rho a$) was measured by a pigment testing method in accordance with JIS-5101. The tap density ($\rho t$) was calculated by the following method. A 20-cc graduated measuring cylinder was gradually packed with 10 g of the magnetic iron oxide particles by using a funnel after the bulk density thereof was measured, and thereafter the cylinder was dropped naturally from a height of 25 mm. After this dropping operation was repeated 600 times, the volume (cc) of the magnetic particles in the cylinder was read. This value was substituted into the equation:

Tap density (g/cc)=10 g/volume (cc).

(8-2) The angle θ of repose was measured by the following method.

The sample powder was passed through a 710-μm sieve in advance. A table having a radius of 3 cm for measuring the angle of repose was prepared, and the 710-μm sieve was set 10 cm above the table. The sample powder which was sieved once was dropped through the sieve, and at the point of time when the sample powder took the shape of a cone on the table, the height (x) of the cone was measured. The sample powder was further dropped, and the height (x) of the cone was measured again. If there is no difference between the heights x measured twice, (x) is substituted into the following formula so as to obtain the angle θ of repose:

$\tan \theta = x/3$.

The smaller the angle θ of repose, the better the fluidity.

(9) The amount of Si attached or adhered on the magnetic particle surfaces was determined by measuring the whole amount of Si and the amount of Si contained in the particle by a fluorescent X-ray analysis according to the "General Rules on Fluorescent X-ray Analyses" of JIS-K-0119 by using a fluorescent X-ray analyzer Model 3063-M (manufactured by Rigaku Denki Kogyo Co., Ltd), and subtracting the amount of Si contained in the particle from the whole amount of Si, by following the steps (1)-(8) described below.

(10) The amount of Si existing on the magnetic particle surface was determined in the same way as used for determination of the amount of Si described above.

(i) The whole amount of Si in the produced magnetic particles (20 g) was determined by the fluorescent X-ray analyzer.

(ii) The produced magnetic particles (20 g) was deflocculated into 200 ml of water which is subjected to ion-exchange treatment and 200 ml of a 2N NaOH solution is added thereto. The resultant dispersion was stirred at 37 to 43° C. for 30 min. The treated particles was filtrated, washed with water and dried. The amount of Si contained in the magnetic particles was determined by the fluorescent X-ray analyzer.

(iii) The difference between the amount of Si obtained in the step (i) and the amount of Si obtained in the step (ii) is determined.

(11) The whole amounts of Fe, Ti, Zr, Si and Al in the magnetic particles were determined in the same way as above, by carrying out a fluorescent X-ray analysis according to the "General Rules on Fluorescent X-ray Analyses" of JIS-K-0119 using a fluorescent X-ray analyzer Model 3063-M (manufactured Rigaku Denki Kogyo Co., Ltd).

(12) The amount of Fe adhered on the magnetic particle surfaces was determined by measuring the whole amount of Fe and the amount of Fe contained in the particle, and subtracting the amount of Fe contained in the particle from the overall amount of Fe, by following the steps (a)-(g) described below.

(13) The amounts of Ti and Zr adhered on the magnetic particle were determined in the same way as the determination method of the amount of Fe described above.

(a) The whole amount of Fe (or Ti or Zr) in the produced magnetic particles is determined by the fluorescent X-ray analyzer. The determined amount is expressed as Ib.

(b)50 g of sample particles are suspended in 1 liter of ion-exchanged water and treated by an ultrasonic cleaner for 60 minutes.

(c) The spinel-type iron oxide particles are magnetically separated from the non-magnetic fine iron oxide and/or hydrous iron oxide particles.

(d) After removing the supernatant, 1 liter of ion-exchanged water is supplied and the solution is treated by the ultrasonic cleaner for 60 minutes.

(e) After repeating the above operation three times, the supernatant is removed and the residue is dried to obtain a powder. The weight of the sample at this point is measured. The measured value is expressed as X (g).

(f) After ultrasonic cleaning, the whole amount of Fe (or Ti or Zr) in the sample is determined by the fluorescent X-ray analyzer. The determined value is expressed as Ia.

(g) The amount of the non-magnetic fine oxides and/or hydrous oxides particles on the magnetic iron oxide particle surfaces was determined from the following formula:

$$Is=Ib-Ia\times(X/50)$$

(14) The amount of hydrophobic treatment agent with which the magnetic particles were coated was calculated as C by measuring the carbon by "Carbon/Sulfur Analyzer EMIA-2200" (Manufactured by Horiba Seisakusho Co., Ltd.).

(15) Oil absorption of the magnetic particles was determined from the pigment testing method of JIS-K-5101.

(16) Moisture absorption was determined as follows. The magnetic particles are deaerated at 120° C. for 2 hours by a deaerator BERSORP 18 (manufactured by Japan Bell Corp). The water-vapor adsorption isotherm is measured at the adsorption temperature of 25° C. and the value obtained under the relative pressure of 0.6 is defined as an index of moisture absorption. The greater the value, the higher is moisture absorption and the worse is environmental stability.

(17) The amount of the non-magnetic fine iron oxide and/or hydrous iron oxide particles adhered on the surfaces of the magnetic particles was determined from the change in weight of the particles before and after the ultrasonic cleaning treatment, by following the steps (i) to (v) described below.

(i) 50 g of sample particles are suspended in 1 liter of ion-exchanged water and treated by an ultrasonic cleaner for 60 minutes.

(ii) The supernatant of the suspension of the non-magnetic fine iron oxide and/or hydrous iron oxide particles is removed by means of natural sedimentation.

(iii) After removing the supernatant, ion-exchanged water is freshly supplied to make the amount of ion-exchanged water 1 liter, and the suspension is treated by the ultrasonic cleaner for 60 minutes.

(iv) After repeating the above operation 5 times, the supernatant is removed and the residue is dried to form a powder.

(v) The weight of the sample at this point is measured and the measured value is expressed as X (g).

The amount Y (wt %) of the non-magnetic fine iron oxide and/or hydrous iron oxide particles is determined from the following formula:

$$Y=\{(50-X)/50\}\times 100$$

(18) The hydrophobic degree was expressed by the monolayer adsorption capacity of $H_2O$ measured by the "Water Vapor Adsorber BELSORP 18" (Manufactured by Japan Bell, Ltd.). The magnetic particles were degassed at 120° C. for 2 hours, and the water vapor adsorption isotherm was measured at an adsorption temperature of 25° C. The hydrophobic degree was obtained by a BET method.

(19) The fluidity of the magnetic toner was measured by a "Powder Teaster PT-E" (manufactured by Hosokawa Micron Co., Ltd.).

Example 1

A suspension of a ferrous salt containing a ferrous hydroxide colloid was produced at pH 6.8 and a temperature of 90° C. by adding 26.7 liter of an aqueous ferrous sulfate containing 1.5 mol/liter of $Fe^{2+}$ to 22.3 liter (equivalent to 0.95 equivalent based on $Fe^{2+}$) of 3.4-N aqueous sodium hydroxide which had been prepared in advance in a reaction vessel. At this time, 250.3 g (equivalent to 3.00 atm %, calculated as Si, based on Fe) of No. 3 water glass ($SiO_2$: 28.8 wt %) was diluted with water into 1 liter of a solution, and the solution was added to the aqueous sodium hydroxide before the addition of the aqueous ferrous sulfate.

After adjusting the pH of the suspension to 8.9 by adding 1.2 liter of 3.5-N aqueous sodium hydroxide to the suspension of the ferrous salt containing the ferrous hydroxide colloid, air was blown into the suspension at 90° C. for 80 minutes at a rate of 100 liter per minute, thereby obtaining a suspension of a ferrous salt containing spherical magnetic nuclear particles.

Thereafter, 10 ml (equivalent to 2.25 equivalents based on the residual $Fe^{2+}$) of 18-N aqueous sodium hydroxide was added to the suspension of the ferrous salt containing the spherical magnetic nuclear particles, and air was blown into the suspension at pH 10 at a temperature of 90° C. for 30 minutes at a rate of 100 liter per minute, thereby producing magnetic particles.

The magnetic particles ($Fe^{2+}$-containing iron oxide particles) produced were washed with water, filtered, dried and pulverized by an ordinary method.

The particle shape of the magnetic particles obtained was spherical, as is clear from the electron microphotograph (×200000) shown in FIG. 1. The average particle diameter was 0.15 μm, and the sphericity $\phi$ was 1.0.

As a result of fluorescent X-ray analysis, it was found that the magnetic particles contain 2.61 atm % of Si based on Fe. The $Fe^{2+}$ content measured by oxidation reduction titration was 19.3 wt %, and the magnetic particles had a sufficient black chromaticity. The sulfur content was 0.14 wt %.

As to the magnetic characteristics, the coercive force was 114 Oe and the saturation magnetization was 86.0 emu/g.

The monomolecular water adsorption was 3.07 mg/g.

Examples 2 to 8, Comparative Examples 1 to 3

Magnetic particles were obtained in the same way as in Example 1 except for varying the alkali equivalent ratio, the amount of Si added and pH of the aqueous solution upon blowing the oxygen-containing gas.

The main producing conditions and the properties of the magnetic particles ($Fe^{2+}$-containing iron oxide particles) produced are shown in Table 1.

TABLE 1

| | Reaction conditions | | | | | |
|---|---|---|---|---|---|---|
| | Kind of divalent metal | Amount of divalent metal (atm %) | Kind of iron compound | Kind of alkali | Kind of silicate | Alkali equivalent ratio ($2OH^-/Fe$) |
| Ex. 1 | — | 0 | $FeSO_4$ | NaOH | No. 3 water glass | 0.95 |
| Ex. 2 | — | 0 | $FeSO_4$ | NaOH | No. 3 water glass | 0.95 |
| Ex. 3 | — | 0 | $FeSO_4$ | NaOH | No. 3 water glass | 0.95 |
| Ex. 4 | — | 0 | $FeSO_4$ | NaOH | potassium silicate | 0.95 |
| Ex. 5 | — | 0 | $FeSO_4$ | KOH | No. 3 water glass | 0.83 |
| Ex. 6 | — | 0 | $FeCl_2$ | NaOH | No. 3 water glass | 0.98 |
| Ex. 7 | Mn | 1.00 | $FeSO_4$ | NaOH | No. 3 water glass | 0.95 |
| Ex. 8 | Zn | 1.35 | $FeSO_4$ | NaOH | No. 3 water glass | 0.95 |
| Comp. Ex. 1 | — | 0 | $FeSO_4$ | NaOH | No. 3 water glass | 0.95 |
| Comp. Ex. 2 | — | 0 | $FeSO_4$ | NaOH | No. 3 water glass | 0.95 |
| Comp. Ex. 3 | — | 0 | $FeSO_4$ | NaOH | No. 3 water glass | 0.95 |

| | Reaction conditions | | | Properties of magnetic particles produced | | |
|---|---|---|---|---|---|---|
| | Si/Fe (atm %) | Adjusted pH at the beginning of blowing oxygen-containing gas | Reaction temprea-ture (°C.) | BET specific surface area ($m^2/g$) | Average particle diameter (μm) | Coercive force (Oe) |
| Ex. 1 | 3.00 | 8.9 | 90 | 14.6 | 0.15 | 114 |
| Ex. 2 | 2.00 | 8.9 | 90 | 11.1 | 0.14 | 115 |
| Ex. 3 | 3.00 | 9.5 | 90 | 10.8 | 0.16 | 145 |
| Ex. 4 | 2.00 | 9.5 | 85 | 10.6 | 0.14 | 150 |
| Ex. 5 | 3.50 | 8.9 | 95 | 18.3 | 0.08 | 139 |
| Ex. 6 | 4.50 | 8.9 | 90 | 16.1 | 0.26 | 87 |
| Ex. 7 | 2.00 | 8.9 | 90 | 10.3 | 0.16 | 112 |
| Ex. 8 | 1.90 | 8.9 | 90 | 9.8 | 0.15 | 105 |
| Comp. Ex. 1 | 7.00 | 8.9 | 90 | 33.0 | 0.18 | 110 |
| Comp. Ex. 2 | 2.00 | 10.0 | 90 | 17.2 | 0.13 | 188 |
| Comp. Ex. 3 | 1.25 | 7.0 | 90 | 11.3 | 0.15 | 85 |

TABLE 1-continued

| | Properties of magnetic particles produced | | | |
|---|---|---|---|---|
| | Saturation magnetization (emu/g) | Particle shape | Sphericity φ | Degree of compression (%) |
| Ex. 1 | 86.0 | Sphere | 1.00 | 38 |
| Ex. 2 | 86.6 | Sphere | 0.98 | 37 |
| Ex. 3 | 87.3 | Sphere | 0.95 | 38 |
| Ex. 4 | 88.6 | Sphere | 0.95 | 39 |
| Ex. 5 | 85.0 | Sphere | 1.00 | 36 |
| Ex. 6 | 86.7 | Sphere | 0.99 | 40 |
| Ex. 7 | 82.6 | Sphere | 1.00 | 39 |
| Ex. 8 | 86.3 | Sphere | 1.00 | 37 |
| Comp. Ex. 1 | 80.5 | Sphere | 1.00 | 39 |
| Comp. Ex. 2 | 82.0 | Octahedron | — | 62 |
| Comp. Ex. 3 | 84.0 | Sphere | 1.00 | 44 |

| | Properties of magnetic particles produced | | | | |
|---|---|---|---|---|---|
| | Angle of repose (°) | Si/Fe (atm %) | $Fe^{2+}$ content (wt %) | S content (wt %) | Oil adsorption (ml/100 g) |
| Ex. 1 | 40 | 2.61 | 19.3 | 0.14 | 20 |
| Ex. 2 | 40 | 1.75 | 18.3 | 0.15 | 19 |
| Ex. 3 | 40 | 2.63 | 18.7 | 0.08 | 21 |
| Ex. 4 | 41 | 1.73 | 18.5 | 0.07 | 20 |
| Ex. 5 | 40 | 2.90 | 17.8 | 0.15 | 20 |
| Ex. 6 | 39 | 3.83 | 18.8 | 0.12 | 20 |
| Ex. 7 | 40 | 1.77 | 18.6 | 0.09 | 20 |
| Ex. 8 | 40 | 1.70 | 19.0 | 0.11 | 21 |
| Comp. Ex. 1 | 40 | 4.97 | 19.4 | 0.15 | 22 |
| Comp. Ex. 2 | 56 | 1.78 | 17.5 | 0.06 | 33 |
| Comp. Ex. 3 | 48 | 1.13 | 16.7 | 0.38 | 18 |

The amount of the monomolecular-adsorpted water adsorption of the magnetic particles produced in Comparative Example 1 was 4.86 mg/g. That is, the magnetic particles in Comparative Example 1 had a higher moisture adsorption than the magnetic particles in Example 1 (3.07 mg/g).

Example 9

10 kg of the spherical magnetic particles obtained in Example 1 and 15 g of a silane coupling agent A-143 (produced by NIPPON UNICAR Co., Ltd.) were charged in wheel-type kneader (trade name: Sand Mill, manufactured by Matsumoto Chuzo Co., Ltd.). By 30 min. operation of the wheel-type kneader, the surfaces of the spherical magnetic particles were covered with the silane coupling agent.

Examples 10 to 13

Treated magnetic particles were obtained in the same way as in Example 9 except for varying the kinds of magnetic particles as core particles to be treated, the kinds and amount of a compound having a hydrophobic group, and the kinds and the operation time of the machine.

The main producing conditions and the properties of the obtained magnetic particles are shown in Table 2.

The shape of the obtained magnetic particles is same as that of the core particles. The average particle diameter, coercive fore and sphericity of the obtained magnetic particles are substantially same as those of the core particles. Also, sulfur content of the obtained magnetic particles is same as that of the core particles.

TABLE 2

| | Core particles | | | |
|---|---|---|---|---|
| Examples | Ex. No. | Monolayer adsorption capacity of $H_2O$ | Compound having a hydrophobic group | Amount added (wt %) |
| Ex. 9 | Ex. 1 | 3.07 | silane coupling agent | 0.15 |
| Ex. 10 | Ex. 2 | 2.76 | silane coupling agent | 1.50 |
| Ex. 11 | Ex. 3 | 3.00 | silane coupling agent | 1.50 |
| Ex. 12 | Ex. 1 | 3.07 | silane coupling agent | 2.00 |
| Ex. 13 | Ex. 1 | 3.07 | silane coupling agent | 1.00 |

| | Properties of magnetic particles | | | | | |
|---|---|---|---|---|---|---|
| Examples | Existing amount of the compound having hydrophobic group (calculated as carbon) (wt %) | Coercive force (Oe) | Saturation magnetization (emu/g) | BET specific surface area ($m^2/g$) | Monolayer adsorption capacity of $H_2O$ (mg/g) | Oil absorption (ml/100 g) |
| Ex. 9 | 0.03 | 114 | 84.7 | 14.0 | 2.75 | 19 |
| Ex. 10 | 0.29 | 114 | 86.0 | 9.2 | 1.40 | 17 |
| Ex. 11 | 0.30 | 142 | 87.1 | 7.8 | 1.62 | 18 |
| Ex. 12 | 0.39 | 113 | 84.0 | 13.4 | 1.56 | 17 |
| Ex. 13 | 0.20 | 113 | 84.2 | 13.7 | 2.10 | 17 |

Example 14

10 kg of the spherical magnetic particles obtained in Example 2 and 204 g of a titanate coupling agent KR-TTS (produced by Ajinomoto Co., Ltd.) were charged in wheel-type kneader (trade name: Sand Mill, manufactured by Matsumoto Chuzo Co., Ltd.). By 1 hour operation of the wheel-type header, the surfaces of the spherical magnetic particles were covered with the titanate coupling agent.

Examples 15 to 20

Treated magnetic particles were obtained in the same way as in Example 14 except for varying the kinds of magnetic particles as core particles to be treated, the kinds and amount of a compound having a hydrophobic group, and the kinds and the operation time of the machine.

The main producing conditions and the properties of the obtained magnetic particles are shown in Table 3.

Examples 21 to 23

10 kg of the spherical magnetite particles obtained in Example 1 (Example 21), Example 3 (Example 22) or Example 4 (Example 23) and 20 g of isopalmitic acid (Example 21), 15 g of isopalmitic acid (Example 22) or 10 g of isostearic acid (Example 23) were charged in wheel-type header (trade name: Sand Mill, manufactured by Matsumoto Chuzo Co., Ltd.). By 1 hour operation of the wheel-type header, the surfaces of the spherical magnetite particles were covered with the silane coupling agent.

The main producing conditions and the properties of the obtained magnetic particles are shown in Table 3.

The shape of the obtained magnetic particles is same as that of the core particles. The average particle diameter, coercive fore and sphericity of the obtained magnetic particles are substantially same as those of the core particles. Also, sulfur content of the obtained magnetic particles is same as that of the core particles.

TABLE 3

| Examples | Core particles: Ex. No. | Core particles: Monolayer adsorption capacity of $H_2O$ | Compound having a hydrophobic group | Amount added (wt %) |
|---|---|---|---|---|
| Ex. 14 | Ex. 1 | 3.07 | titanate coupling agent | 2.00 |
| Ex. 15 | Ex. 2 | 2.76 | titanate coupling agent | 1.50 |
| Ex. 16 | Ex. 4 | 2.51 | titanate coupling agent | 1.50 |
| Ex. 17 | Ex. 5 | 3.58 | titanate coupling agent | 1.00 |
| Ex. 18 | Ex. 6 | 3.13 | titanate coupling agent | 0.50 |
| Ex. 19 | Ex. 1 | 3.07 | titanate coupling agent | 0.50 |
| Ex. 20 | Ex. 1 | 3.07 | titanate coupling agent | 1.50 |
| Ex. 21 | Ex. 1 | 3.07 | isopalmitic acid | 0.20 |
| Ex. 22 | Ex. 3 | 3.00 | isopalmitic acid | 0.15 |
| Ex. 23 | Ex. 4 | 2.51 | isopalmitic acid | 0.10 |

| Examples | Properties of magnetic particles: existing amount of the compound having hydrophobic group (calculated as carbon) (wt %) | Coercive force (Oe) | Saturation magnetization (emu/g) | BET specific surface area ($m^2/g$) | Monolayer adsorption capacity of $H_2O$ (mg/g) | Oil absorption (ml/100 g) |
|---|---|---|---|---|---|---|
| Ex. 14 | 1.38 | 115 | 85.1 | 13.7 | 1.67 | 16 |
| Ex. 15 | 1.07 | 114 | 86.0 | 10.9 | 1.81 | 16 |
| Ex. 16 | 0.98 | 150 | 88.2 | 10.4 | 1.58 | 17 |
| Ex. 17 | 0.69 | 137 | 85.0 | 17.5 | 2.80 | 17 |
| Ex. 18 | 0.31 | 87 | 86.3 | 16.0 | 2.99 | 17 |
| Ex. 19 | 0.36 | 114 | 85.9 | 14.3 | 2.82 | 18 |
| Ex. 20 | 1.00 | 114 | 86.0 | 14.1 | 2.03 | 16 |
| Ex. 21 | 0.13 | 114 | 85.5 | 13.9 | 2.70 | 15 |
| Ex. 22 | 0.09 | 143 | 87.0 | 8.9 | 2.86 | 15 |
| Ex. 23 | 0.06 | 149 | 88.4 | 9.3 | 2.25 | 16 |

Example 24

10 kg of the magnetic iron oxide particles obtained in Example 1 and 309 g of fine granular $TiO_2$ particles having a diameter of 0.04 μm were mixed and the obtained mixture was treated in a Simpson mix muller under a linear load of 50 kg for 30 minutes to adhere the fine $TiO_2$ particles to the magnetic iron oxide particles.

Scanning electron micrographic observation of the obtained particles showed that the fine granular $TiO_2$ particles were adhered with proper spaces from each other on the surfaces of the magnetic particles.

The main preparation conditions used in the procedure, and the properties of the obtained magnetic particles are shown in Table 4.

Examples 25 to 29

Treated magnetic particles were obtained in the same way as in Example 24 except for varying the kinds of magnetic particles as core particles to be treated, the non-magnetic fine oxides or hydrous oxides particles, and the adhering conditions.

Scanning electron micrographical observation showed that the particles obtained in Examples 24 to 29 were all the magnetic iron oxide particles having the non-magnetic fine oxides or hydrous oxides particles adhered on the surfaces with proper spaces from each other.

The main preparation conditions used in the procedure, and the properties of the obtained particles are shown in Table 4.

The shape of the obtained magnetic particles is same as that of the core particles. The average particle diameter, coercive fore and sphericity of the obtained magnetic particles are substantially same as those of the core particles. Also, sulfur content of the obtained magnetic particles is same as that of the core particles.

TABLE 4

| Examples | Kind of core particles to be treated | Non-magnetic fine oxides or hydrous oxides particles: Kind | Shape | Size (μm) | Amount treated (wt %) |
|---|---|---|---|---|---|
| Ex. 24 | Ex. 1 | $TiO_2$ | Granular | 0.04 | 3.0 |
| Ex. 25 | Ex. 1 | $Al_2O_3$ | Granular | 0.03 | 1.0 |
| Ex. 26 | Ex. 1 | $ZrO_2$ | Granular | 0.03 | 0.5 |
| Ex. 27 | Ex. 1 | $\alpha$-$Fe_2O_3$ | Granular | 0.03 | 5.0 |
| Ex. 28 | Ex. 1 | $SiO_2$ | Granular | 0.02 | 5.0 |
| Ex. 29 | Ex. 1 | $\alpha$-FeOOH | Acicular | 0.10 × 0.02 | 2.0 |

| Examples | Properties of magnetic particles: Amount of non-magnetic fine oxides and hydrous oxides particles (wt %) | BET specific surface area ($m^2/g$) | Oil absorption (ml/100 g) |
|---|---|---|---|
| Ex. 24 | 2.81 | 14.0 | 16 |
| Ex. 25 | 0.89 | 14.3 | 17 |
| Ex. 26 | 0.50 | 14.4 | 19 |
| Ex. 27 | 4.52 | 13.5 | 15 |
| Ex. 28 | 4.60 | 13.1 | 20 |
| Ex. 29 | 1.91 | 14.1 | 18 |

| Examples | Properties of magnetic particles: Compression degree (%) | Saturation magnetization (emu/g) |
|---|---|---|
| Ex. 24 | 36 | 84.1 |
| Ex. 25 | 38 | 85.2 |
| Ex. 26 | 38 | 85.4 |
| Ex. 27 | 36 | 81.0 |
| Ex. 28 | 37 | 82.3 |
| Ex. 29 | 38 | 84.8 |

Example 30

To this alkaline suspension containing the magnetic particles and the residual silicon component after the second-stage oxidation reaction, which was obtained in Example 1, 0.03 liters of a 10% aqueous solution of aluminum sulfate (corresponding to 0.1 wt % based on magnetite) was added and stirred for 30 minutes. Thereafter, 3N dilute sulfuric acid was added to the suspension to adjust its pH to 7. The resultantly formed black precipitate was filtered, washed with water and dried in the usual ways to obtain the black particles.

The result of electron micrographic observation of these black particles showed that they were spherical. The properties of the obtained black particles are shown in Table 5.

In view of the facts that a water-soluble silicate and an aluminum compound are allowed to exist at the same time in the solution, and that the obtained magnetic iron oxide particles have very excellent charging stability, and silica and alumina are uniformly distributed to level off the charges as compared with the magnetic iron oxide particles in which the fine silica particles and the fine alumina particles are deposited in the form of a mixture on the magnetic iron oxide particle surfaces, it is considered that the magnetic iron oxide particles according to the present invention have a hydrous coprecipitate of silica and alumina deposited (attached) thereon.

Examples 31 to 32

Treated magnetic particles were obtained in the same way as in Example 30 except for varying the kinds of magnetic particles as core particles to be treated, the concentration of ferrous hydroxide, and the kind and amount added of the water-soluble salt.

The main preparation conditions used here, and the properties of the obtained magnetic iron oxide particles are shown in Table 5.

The magnetic iron oxide particles obtained in Examples 30 to 32 were all found to have a spherical shape as a result of electron microscopical observation of these particles.

The shape of the obtained magnetic particles is same as that of the core particles. The average particle diameter, coercive fore and sphericity of the obtained magnetic particles are substantially same as those of the core particles. Also, sulfur content of the obtained magnetic particles is same as that of the core particles.

TABLE 5

| Examples | Kind of particles to be treated | Added compound: Kind of compound | Added compound: Amount treated (wt %) |
|---|---|---|---|
| Ex. 30 | Ex. 1 | Aluminum sulfate | 0.1 |
| Ex. 31 | Ex. 1 | Aluminum sulfate | 0.2 |
| Ex. 32 | Ex. 1 | Aluminum sulfate | 0.5 |

TABLE 5-continued

| Examples | Properties of magnetic particles: Amount of oxides, hydroxides and/or hydrous oxides (wt %) | BET specific surface area ($m^2/g$) | Oil absorption (ml/100 g) | Compression degree (%) |
|---|---|---|---|---|
| Ex. 30 | $SiO_2$: 1.00<br>Al: 0.10 | 14.1 | 17 | 37 |
| Ex. 31 | $SiO_2$: 1.00<br>Al: 0.20 | 14.7 | 15 | 36 |
| Ex. 32 | $SiO_2$: 1.00<br>Al: 0.48 | 16.3 | 14 | 32 |

Example 33

10 kg of the spherical magnetic particles obtained in Example 30 and 15 g of a silane coupling agent A-143 (produced by NIPPON UNICAR Co., Ltd.) were charged in wheel-type kneader (trade name: Sand Mill, manufactured by Matsumoto Chuzo Co., Ltd.). By 30 min. operation of the wheel-type kneader, the surfaces of the spherical magnetic particles were covered with the silane coupling agent.

The main preparation conditions used in the procedure, and the properties of the obtained particles are shown in Table 6.

Examples 34 to 36

Treated magnetic particles were obtained in the same way as in Example 33 except for varying the kinds of magnetic particles as core particles to be treated, the concentration of ferrous hydroxide, the kind and amount added of the water-soluble salt, the kinds and amount of a compound having a hydrophobic group, and the kinds and the operation time of the machine.

The main preparation conditions used in the procedure, and the properties of the obtained particles are shown in Table 6.

The shape of the obtained magnetic particles is same as that of the core particles. The average particle diameter, coercive fore and sphericity of the obtained magnetic particles are substantially same as those of the core particles. Also, sulfur content of the obtained magnetic particles is same as that of the core particles.

TABLE 6

| Examples | Core particles: Ex. No. | Core particles: Monolayer adsorption capacity of $H_2O$ | Compound having a hydrophobic group | Amount added (wt %) |
|---|---|---|---|---|
| Ex. 33 | Ex. 30 | 3.61 | silane coupling agent | 0.15 |
| Ex. 34 | Ex. 31 | 3.78 | silane coupling agent | 1.50 |
| Ex. 35 | Ex. 30 | 3.61 | titanate coupling agent | 2.00 |
| Ex. 36 | Ex. 32 | 3.92 | titanate coupling agent | 1.50 |

TABLE 6-continued

| | Properties of magnetic particles | | | | | |
|---|---|---|---|---|---|---|
| Examples | Existing amount of the compound having hydrophobic group (calculated as carbon) (wt %) | Coercive force (Oe) | Saturation magnetization (emu/g) | BET specific surface area ($m^2/g$) | Monolayer adsorption capacity of $H_2O$ (mg/g) | Oil absorption (ml/100 g) |
| Ex. 33 | 0.03 | 113 | 84.5 | 13.8 | 2.80 | 16 |
| Ex. 34 | 0.28 | 113 | 83.3 | 14.1 | 2.02 | 15 |
| Ex. 35 | 1.31 | 112 | 83.9 | 13.5 | 1.74 | 13 |
| Ex. 36 | 0.95 | 114 | 84.8 | 16.0 | 2.15 | 13 |

Example 37

The spherical magnetic particles obtained in Example 1 were mixed with the following components in the following mixing ratio by a mixer, and the obtained mixture was melted and kneaded for 10 minutes by a hot twin roll. After chilling the kneaded mixture, it was pulverized into coarse particles and then into fine particles (by a fine mill). The pulverized particles were classified to obtain a magnetic toner composed of the particles having a volume-average particle diameter of 12 to 13 μm (measured by a "Couter Counter TA-II", manufactured by Couter Electronics Corporation). 0.5 part by weight of hydrophobic fine silica particles were externally added to 100 parts by weight of the magnetic toner obtained. The flowability of the final magnetic toner was 90.

| Composition: | |
|---|---|
| Styrene-acrylate copolymer: | 100 parts by weight |
| Negative charge control agent: | 0.5 part by weight |
| Mold release agent: | 6 parts by weight |
| Magnetic particles: | 60 parts by weight |

An image was produced by a laser shot LBP-B406E using the magnetic toner, and the image quality was evaluated.

The image had a high fine line reproducibility free from background development and without any toner flown about on the image. Since the fluidity of the toner was high, the toner was coated uniformly on the sleeve, so that the rush print had a uniform blackness. The fine line producibility, and the image quality were stable for a long period.

What is claimed is:

1. Spherical magnetic particles for a magnetic toner comprising:

$Fe^{2+}$-containing iron oxide particles having an average particle diameter of 0.05 to 0.30 μm, containing 1.7 to 4.5 atm % of silicon, calculated as Si, based on Fe and not more than 0.35 wt % of sulfur based on the total weight of said $Fe^{2+}$-containing iron oxide particles, and having a sphericity φ represented by the following formula of 0.8 to 1.0:

$$\phi = l/w$$

wherein l represents an average minor axial diameter of said $Fe^{2+}$-containing particles and w represents an average major axial diameter of said $Fe^{2+}$-containing particles, and a coercive force (Hc) and the average particle diameter (d μm) which satisfy the following relationship:

$$147-322.7\times d \leqq Hc(10\ kOe) \leqq 207-322.7\times d.$$

2. Magnetic particles according to claim 1, wherein said average particle diameter is 0.1 to 0.3 μm, the Si content is 2.0 to 4.0, calculated as Si, based on Fe, the sulfur content is not more than 0.25 wt % based on the total weight of said magnetic iron oxide particles and said sphericity φ is 0.83 to 1.00.

3. Magnetic particles according to claim 1, wherein the $Fe^{2+}$ content is 12 to 24 wt % based on the total weight of said magnetic iron oxide particles.

4. Magnetic particles according to claim 1, wherein the saturation magnetization is 80 to 92 emu/g, the coercive force is 50 to 191 Oe, the degree of compression is not more than 45 and the angle of repose is not more than 45°.

5. Magnetic particles according to claim 1, wherein a compound having a hydrophobic group is existent on the surface of said magnetic iron oxide particles in an amount of 0.1 to 2.0 wt %.

6. Magnetic particles according to claim 5, wherein said compound having a hydrophobic group is silane coupling agents, titanate coupling agents, aluminate coupling agents, zirconate coupling agents, silicones, fatty acids having carbon atoms of not less than 8 and surfactants.

7. Magnetic particles according to claim 1, wherein non-magnetic fine oxides particles, non-magnetic fine hydrous oxides particles or mixed fine particles thereof comprising at least one element selected from the group consisting of Fe, Ti, Zr, Si, Al, Mn and Zn are adhered on the surface of said magnetic particles in an amount of 0.1 to 20 wt %.

8. Magnetic particles according to claim 7, wherein the non-magnetic fine oxides particles are granular, acicular, spindle or plate-like hematite fine particles, granular or columnar $TiO_2$ fine particles, granular $SiO_2$ fine particles, or granular or acicular $Al_2O_3$ fine particles, and the non-magnetic fine hydrous oxides particles are granular, acicular, spindle or plate-like goethite, lepidcrocite or akageneite fine particles, granular AlOOH fine particles, or granular $TiO(OH)_2$ fine particles.

9. Magnetic particles according to claim 7, wherein the average diameter of the non-magnetic fine oxides particles, non-magnetic fine hydrous oxides particles and mixed fine particles thereof is 0.01 to 0.1 μm.

10. Magnetic particles according to claim 1, wherein oxides, hydroxides, hydrous oxides or mixture thereof comprising at least one element selected from the group consisting of Ti, Zr, Si, Al, FIn and Zn are deposited on the surface of said magnetic particles in an amount of 0.01 to 20 wt %.

11. Magnetic particles according to claim 10, wherein coprecipitated oxides, hydroxides, hydrous oxides or mixture thereof comprising Si and at least one element selected from the group consisting of Ti, Zr, Al, Mn and Zn are deposited on the surface of said magnetic particles in an amount of 0.01 to 20 wt %.

12. Magnetic particles according to claim 1, wherein oxides, hydroxides, hydrous oxides or the mixture thereof comprising at least one element selected from the group consisting of Ti, Zr, Si, Al, Mn and Zn are deposited on the surface of the magnetic particles as core particles in an amount of 0.01 to 20 wt %; and a compound having a hydrophobic group is existent on the oxides, hydroxides and/or hydrous oxides comprising at least one element selected from the group consisting of Ti, Zr, Si, Al, Mn and Zn, in the amount of the compound having a hydrophobic group in an amount of 0.1 to 2.0 wt %.

13. Magnetic particles according to claim 12, wherein coprecipitated oxides, hydroxides, hydrous oxides or mixture thereof comprising Si and at least one element selected from the group consisting of Ti, Zr, Al, Mn and Zn are deposited on the surface of said magnetic particles in an amount of 0.01 to 20 wt %.

14. A process for producing spherical magnetic iron oxide particles for a magnetic toner according to claim 1, said process comprising:

carrying out a first-stage oxidation reaction for producing magnetic particles comprising blowing an oxygen-containing gas under heating to a temperature range of 70° to 100° C., into an aqueous solution of a ferrous salt containing a ferrous hydroxide colloid which is obtained by reacting an aqueous solution of a ferrous salt and 0.80 to 0.99 equivalent of an aqueous alkali hydroxide based on said ferrous salt, 1.7 to 6.5 atm % of a water-soluble silicate, calculated as Si, based on Fe being added in advance to either of said aqueous alkali hydroxide and said aqueous solution of said ferrous salt containing said ferrous hydroxide colloid, and the pH of the aqueous reaction solution into which the oxygen-containing gas is blown being adjusted to 8.0 to 9.5 at the beginning of the step of blowing said oxygen-containing gas;

carrying out a second-stage oxidation reaction for producing magnetic particles by after adding not less than 1.00 equivalent of an aqueous alkali hydroxide based on the residual $Fe^{2+}$ to the aqueous solution after the end of said first-stage reaction, blowing an oxygen-containing gas into the resultant aqueous solution under heating to a temperature range of 70° to 100° C.; and as occasion demands, after the second-stage reaction, neutralizing the resultant suspension to deposit the residual silicon component on the surface of the produced particles.

15. A magnetic toner comprising: 100 parts by weight of magnetic particles according to claim 1; and 10 to 900 parts by weight of a resin for a toner.

* * * * *